(12) United States Patent
Brown et al.

(10) Patent No.: US 7,046,687 B1
(45) Date of Patent: May 16, 2006

(54) CONFIGURABLE VIRTUAL OUTPUT QUEUES IN A SCALABLE SWITCHING SYSTEM

(75) Inventors: Philip Desborough Pritchard Brown, Santa Cruz, CA (US); Peter Johnson, Santa Cruz, CA (US); Chin-Tau Lea, Cupertino, CA (US)

(73) Assignee: Tau Networks, Redwood City, CA (US)

( * ) Notice: Subject to any disclaimer, the term of this patent is extended or adjusted under 35 U.S.C. 154(b) by 954 days.

(21) Appl. No.: 10/051,990

(22) Filed: Jan. 16, 2002

(51) Int. Cl.
*H04L 12/28* (2006.01)
(52) U.S. Cl. ..................... 370/412; 370/419
(58) Field of Classification Search ............ None
See application file for complete search history.

(56) References Cited

U.S. PATENT DOCUMENTS

| | | | | |
|---|---|---|---|---|
| 5,414,704 A | * | 5/1995 | Spinney | 370/389 |
| 5,493,669 A | * | 2/1996 | Denman, Jr. | 711/133 |
| 5,535,197 A | * | 7/1996 | Cotton | 370/395.72 |
| 5,877,639 A | * | 3/1999 | Porcher et al. | 327/114 |
| 6,088,745 A | * | 7/2000 | Bertagna et al. | 710/56 |
| 6,700,809 B1 | * | 3/2004 | Ng et al. | 365/49 |
| 6,876,559 B1 | * | 4/2005 | Rathnavelu et al. | 365/49 |
| 6,950,400 B1 | * | 9/2005 | Tran et al. | 370/236 |

OTHER PUBLICATIONS

PM9311/2/3/5, Enhanced TT1 Chip Set, Enhanced TT1 Switch Fabric Datasheet; Issue 2: Aug. 2000; PMC-Sierra, Inc. pp. i-306.

* cited by examiner

*Primary Examiner*—Andrew Lee
(74) *Attorney, Agent, or Firm*—Fish & Richardson P.C.

(57) ABSTRACT

Configurable virtual output queues (VOQs) in a scalable switching system and methods of using the queues are provided. The system takes advantage of the fact that not all VOQs are active or need to exist at one time. Thus, the system advantageously uses configurable VOQs and may not dedicate memory space and logic to all possible VOQs at one time.

46 Claims, 20 Drawing Sheets

4 x 4 Node

Control Unit

Cell Lookup CAM Entry Format

| | |
|---|---|
| Bit[0] | Valid |
| Bits[10:1] | Pointer |
| Bits[13:11] | Priority |
| Bits[24:14] | Destination Address |

Unicast Request Store Entry Format

| Bit[0]      | Valid                |
|-------------|----------------------|
| Bits[7:1]   | Priority             |
| Bits[19:8]  | Destination Address0 |
| Bits[23:20] | Request Count        |
| Bits[33:24] | Head Pointer         |
| Bits[43:34] | Tail Pointer         |
| Bit[44]     | Queue Over Limit     |
| Bit[45]     | Flow Control         |

FIG. 16A

| Bit[0]      | Valid                |
|-------------|----------------------|
| Bits[3:1]   | Priority             |
| Bits[15:4]  | Destination Address0 |
| Bits[19:16] | Request Count        |
| Bits[29:20] | Head Pointer         |
| Bits[39:30] | Tail Pointer         |
| Bit[40]     | Flow Control         |

FIG. 16B

Multicast Request Store Entry Format

| | |
|---|---|
| Bit[0] | Valid |
| Bits[3:1] | Priority |
| Bits[7:4] | Cell Requested |
| Bits[11:8] | Cell Sent |
| Bits[15:12] | Flow Control |
| Bits[25:16] | Cell Address |
| Bits[37: 26] | Destination Address0 |
| Bits[49: 38] | Destination Address1 |
| Bits[61: 50] | Destination Address2 |
| Bits[73: 62] | Destination Address3 |

FIG. 17

1800
Receive Unicast Cell; Examine Destination Address and Priority Level of Received Cell 1802
Locate or Create an Entry in the Unicast Request Store Unit that has the Same Destination Address and Priority Level as the Received Cell 1804
Locate an Available entry in the CAM; Transfer the Destination Address, Priority Level and Tail Pointer from the Request Store Entry to the Destination Address, Priority Level and Pointer Fields of the Located Entry in the CAM and Assert the Valid Bit of the CAM Entry 1806
Write the Received Cell into a Memory Location in the RAM that Corresponds to the Address of the new CAM Entry 1808
Increment the Tail Pointer of the Entry in the Request Store Unit

FIG. 18

CONFIGURABLE VIRTUAL OUTPUT QUEUES IN A SCALABLE SWITCHING SYSTEM

BACKGROUND OF THE INVENTION

1. Field of the Invention

The present invention relates to communication systems and methods, and in particular to switching systems and methods.

2. Description of the Related Art

Internet demand has pushed bandwidth growth at a long distance carrier's Point Of Presence (POP)(e.g., generally in the form of a switch or router) by five times a year. At this rate, the bandwidth requirement at a POP will be several terabits/sec. The bandwidth explosion is not limited to the Internet backbone. One-gigabit Ethernets have been proposed, and 10 gigabits per second (Gbps) links may be needed to connect the Ethernets.

On the transmission side, Dense Wavelength Division Multiplexing (DWDM) technology has been developed in an attempt to meet the tremendous bandwidth demand. With DWDM technology, a hundred wavelengths may be put on a single fiber, and there is potentially an almost infinite capacity for transmission. In contrast, the capacity of switches and routers has not grown at the same rate, and is significantly lagging behind. The challenge posed by DWDM technology for switching is not just capacity. DWDM also created an explosion in the number of ports for a switch to handle. A hundred wavelengths mean a hundred ports will terminate on a switch. If a switch or router has ten terminating fibers, the switch or router needs to handle 1000 ports.

To keep up with transmission, it is desirable for a switching system to accommodate hundreds or even thousands of ports. The switching system should possess a simplicity that matches the system's ability to scale. Otherwise, a thousand-port switching system may collapse on its own complexity.

Some existing switching systems are designed with single-stage crossbars, which attempt to handle about 32 ports. Some existing switching systems include N. McKwown, "A Fast Switched Backplane For A Gigabit Switched Router," Business Communications Review, Dec. 1997, "Cisco 75000 Router Series datasheet" from Cisco, and "Enhanced TT1 Switch Fabric Datasheet" from PMC-Sierra Inc. But these systems cannot scale, i.e., the structure and scheduling algorithm(s) of these systems prevent the systems from handling more than 32 ports.

SUMMARY OF THE INVENTION

Configurable virtual output queues in a scalable switching system and methods of using the queues are provided in accordance with the present invention. One embodiment of the system comprises a plurality of port processors, which provide an interface between a plurality of line cards and a scheduler. The port processors receive data cells from the line cards and send schedule requests to the scheduler. The scheduler provides routing and timing information, i.e., schedule grants, to the port processors. The port processors send cells with schedule grants to a switch fabric, which switches the cells between the port processors.

When a destination port processor or a line card coupled to the destination port processor has a problem, other port processors (source port processors) in the system may apply a "flow control" process to prevent or reduce the rate of cells sent to the destination port processor. Flow control may cause head-of-line (HOL) blocking in a source port processor. For example, a head-of-line cell in a cell buffer of the source port processor is destined for a flow-controlled address. While the head-of-line cell waits to be switched, other cells behind the waiting cell in the cell buffer are blocked from progressing through the switch.

In order to avoid HOL blocking, separate queues called virtual output queues (VOQs) may be implemented for every possible destination port and priority combination. For a system with 512 port processors and four Optical Carrier-level 48 (OC-48) subports per port processor, there are 2048 total possible destination port addresses. If there are seven different priority levels, the total number of VOQs for this system is 14,336.

The system in accordance with one embodiment of the present invention takes advantage of the fact that not all VOQs are active or need to exist at one time. Thus, the system advantageously uses configurable VOQs and may not dedicate memory space and logic to all possible VOQs at one time. The configurable VOQs help reduce memory and logic requirements and improve scalability of the system. In one embodiment of the system, the VOQs store information about cells stored in a shared buffer, which may store up to 1024 cells.

One aspect of the invention relates to a port processor configured to receive data packets from a line card. Each data packet comprises a destination port address and data. The port processor comprises a random access memory (RAM), a content addressable memory (CAM), a storage unit and a controller. The RAM is configured to store packets from the line card. The CAM is configured to store a plurality of entries. Each CAM entry is configured to comprise (a) a destination port address field and (b) a pointer field. Each CAM entry has a memory address corresponding to a memory location of the RAM. The storage unit is configured to store a plurality of queue entries. Each queue entry is configured to comprise (a) a destination port address of a set of one or more CAM entries, (b) a header pointer field equal to a pointer field of a first CAM entry in the set, and (c) a tail pointer field equal to a pointer field of a last CAM entry in the set. The controller is configured to control the RAM, CAM and storage unit.

Another aspect of the invention relates to a controller in a packet switching system. The controller is configured to (a) receive a packet from a line card, (b) find a queue entry in a storage unit, the queue entry comprising a destination port address equal to a destination port address of the packet, (c) write an entry in a content addressable memory (CAM), the CAM entry comprising the destination port address of the packet and a pointer value from the queue entry, and (d) store the packet in a location in a random access memory (RAM) corresponding to a memory address of the CAM entry.

Another aspect of the invention relates to a controller in a packet switching system. The controller is configured to (a) receive a multicast packet from a line card, the packet comprising data and a plurality of destination port addresses, (b) store an entry in a storage unit, the entry comprising the destination port addresses of the packet and an address of a location in a random access memory (RAM) configured to store the packet, and (c) store the packet in the location of the RAM.

Another aspect of the invention relates to a method of managing a packet in a packet switching system. The method comprises creating a queue entry based on a destination port address of a packet received from a line card, the queue entry comprising the destination port address of the packet and a tail pointer value; transferring the destination address and tail pointer value to an available entry in a content addressable memory (CAM); and writing the packet to a location in a random access memory (RAM) that corresponds to an address of the entry in the CAM.

Another aspect of the invention relates to a method of processing a multicast packet. The method comprises receiving a multicast packet from a line card, the packet comprising data and a plurality of destination port addresses; storing an entry in a storage unit, the entry comprising the destination port addresses of the packet and an address of a location in a random access memory (RAM) configured to store the packet; and storing the packet in the location of the RAM.

BRIEF DESCRIPTION OF THE DRAWINGS

FIG. 16A illustrates an exemplifying format of each entry in a unicast request store unit, such as the request store unit in FIG. 14.

FIG. 16B illustrates another exemplifying format of each entry in a unicast request store unit, such as the request store unit in FIG. 14.

FIG. 17 illustrates an exemplifying format of each entry in a multicast request store unit, such as the request store unit in FIG. 14.

FIG. 18 illustrates a method of processing an incoming unicast cell with the structure in FIG. 14.

DETAILED DESCRIPTION

Various aspects of a scalable switching system and methods of using the same are described in co-assigned (1) U.S. patent application Ser. No. 09/768,528, entitled "Scalable Switching System and Method," filed on Jan. 23, 2001, (2) U.S. patent application Ser. No. 09/779,414, entitled "Intelligent Flow Control and Input/Output Buffer Distribution for Removing Head-of-Line-Blocking," filed on Feb. 6, 2001, (3) U.S. patent application Ser. No. 09/956,612, entitled "Multiple Schedulers in a Scalable Switching System", filed on Sep. 18, 2001 and (4) U.S. patent application Ser. No. 09/956,338, entitled "Virtual Output Queues in a Scalable Switching System", filed on Sep. 18, 2001, which are all hereby incorporated by reference in their entireties.

Switch Architecture 101

Figure 1:
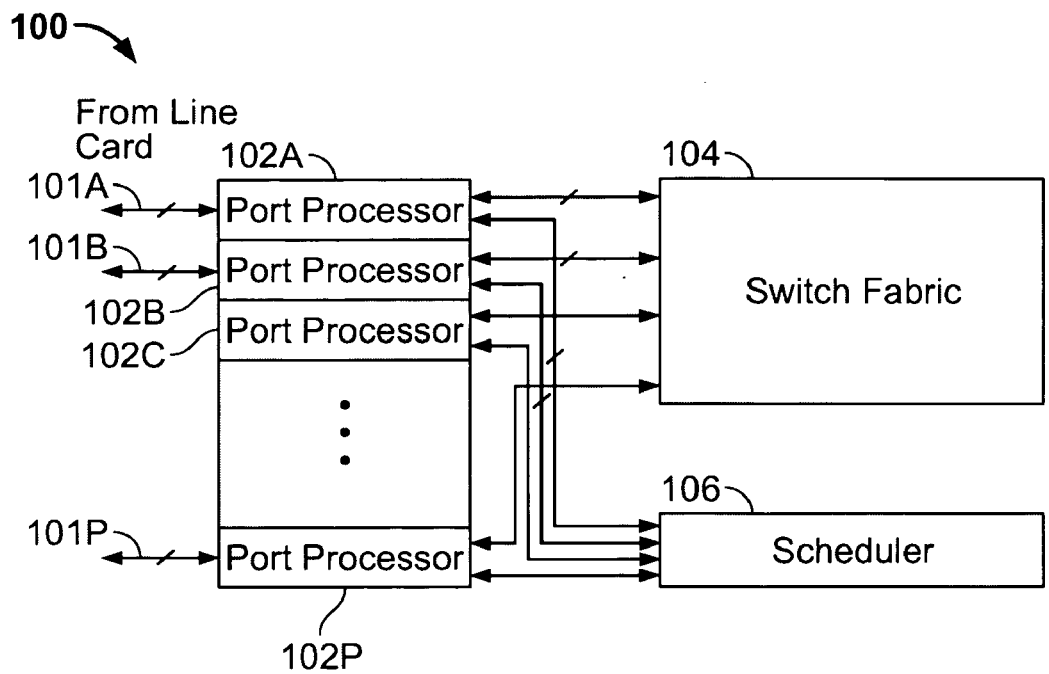
FIG. 1 illustrates one embodiment of an overall switch architecture in accordance with the present invention.

FIG. 1 illustrates one embodiment of an overall switch architecture 100 in accordance with the present invention. The switch architecture 100 in FIG. 1 comprises a plurality of port processors (PPs) 102A–102P, a switch fabric (SF) 104 (also called a switching matrix) and a scheduler 106. The switch architecture 100 may have any number of port processors 102A–102P. For example, in other embodiments, the switch architecture 100 may have 16, 32, 64, 100, 1000 or more port processors. Each port processor 102 in FIG. 1 interfaces with a line card (not shown) via the port 101 using a pre-defined protocol, such as Common Switch Interface (CSIX) or LineCard-to-Switch (LCS), used in the communication industry. A line card is a plug-in electronic printed circuit card that operates features associated with one or more telephones or telephone systems.

In general, the port processors 102A–102P in FIG. 1 receive and buffer incoming packets (also called cells) of information, such as video, audio or data, via the ports 101A–101P. Each cell is intended to be switched from one port 101 to another port 101. Thus, the ports 101A–101P serve as input ports as well as destination/output ports. Multiple cells may be intended for a single output port 101. The port processors 102A–102P buffer the cells, separate a header from each cell, and send the headers to the scheduler 106 for scheduling. The scheduler 106 determines which buffered cells will be switched and output to the ports 101A–101P. The scheduler 106 resolves any contentions between the headers by comparing priority levels of the headers. The scheduler 106 sends a request grant back to each port processor 102 which sent a header that either (a) did not contend with other headers or (b) contended with other headers but had a higher priority level than the contending headers. The port processors 102A–102P send buffered cells specified by the request grants from the scheduler 106 to the switch fabric 104. The switch fabric 104 switches multiple cells simultaneously in a time 'slot' (a cell transmission time) between the input/output ports 101A–101P.

In one embodiment, for Optical Carrier level 192 (OC-192) rates, the scheduler 106 performs scheduling in 20 ns or less. OC-192 is a Synchronous Optical Network (SONET) channel of about 9.953 Gbps. SONET is a family of fiber optic transmission rates created to provide flexibility in transporting digital signals with different capacities. SONET provides an optical interface standard that allows interworking of transmission products from multiple vendors. Examples of other SONET standards include OC-1, OC-3, OC-12, OC-48, OC-256 and OC-768.

Port Processors 102A–102P

Figure 2:
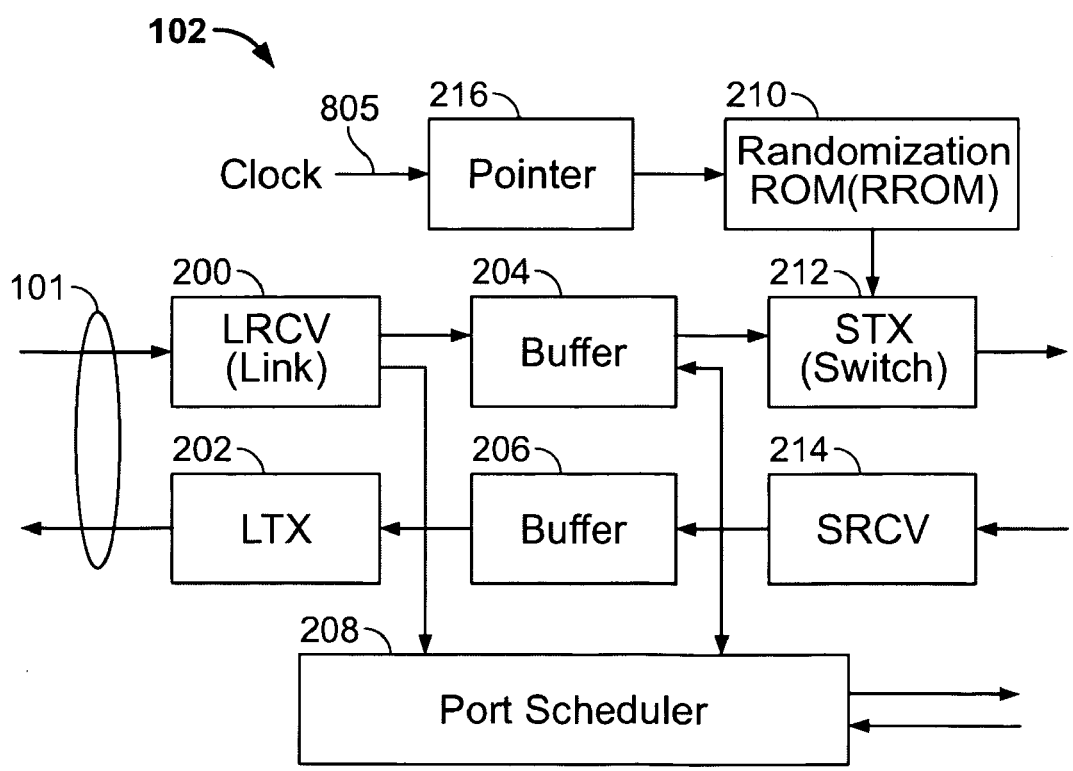
FIG. 2 illustrates one embodiment of a port processor in the switch architecture of FIG. 1.

FIG. 2 illustrates one embodiment of a port processor 102 in the switch architecture 100 of FIG. 1. The port processor 102 in FIG. 2 comprises a link receiver (LRCV) 200, a link transmitter (LTX) 202, a first buffer 204, a second buffer 206, a port scheduler 208, a randomization read-only memory (RROM) 210, a switch transmitter (STX) 212, a switch receiver (SRCV) 214 and a pointer 216.

The link receiver 200 and the link transmitter 202 in FIG. 2 are configured to perform protocol functions with a line card (not shown) via input and output portions of the input/output port 101, respectively. The link receiver 200 in FIG. 2 receives cells of information from a line card (not shown) via the input portion of the input/output port 101. A 'cell' is a fixed-size packet for transmission in various communication systems, such as Switched Multimegabit Data Service (SMDS) and Asynchronous Transfer Mode (ATM). The cell comprises a header 330 (FIG. 3A) and a trailer (not shown), which comprises data bits.

Figure 3A:
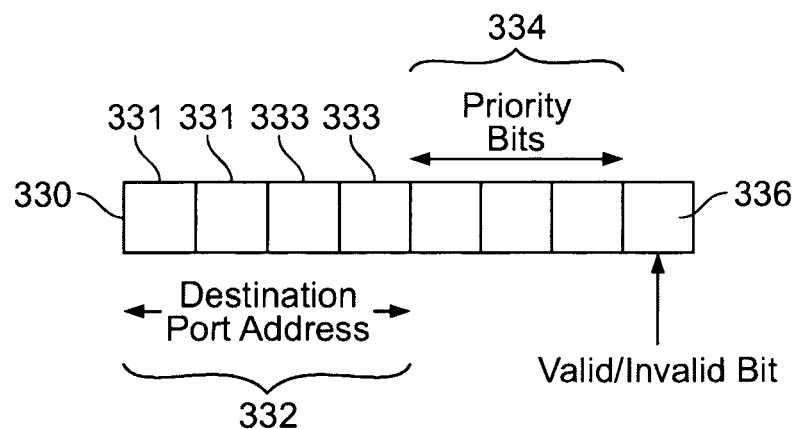
FIG. 3A illustrates one embodiment of a header of a cell received by the port processor in FIG. 2.

FIG. 3A illustrates one embodiment of a header 330 of a cell received by the link receiver 200 in FIG. 2. The cell header 330 in FIG. 3A is a byte of information comprising a four-bit destination port address field 332, a three-bit priority field 334 (three bits for eight priority levels), and a one-bit valid/invalid field 336. The four-bit destination port address field 332 specifies one of sixteen possible output ports 101A–101P (FIG. 1) for outputting the cell received by the link receiver 200 (FIG. 2).

The format of the header 330 in FIG. 3A is shown only as an example. The size of each field in the header 330 may be larger or smaller, depending on the number of destination ports 101A–101P (FIG. 1), the size of the scheduler 106, the size of the switch fabric 104 and other factors. For example, in one configuration, the destination port address field 332 is seven bits wide and specifies one of 128 possible output ports for a switch architecture 100 (FIG. 1) with 128 ports.

The link receiver 200 in FIG. 2 sends incoming cells or cell headers to the port scheduler 208. The link receiver 200 or the port scheduler 208 separates the cell header 330 (FIG. 3A) from each incoming cell. The port scheduler 208 (FIG. 2) sends each cell header 330 (FIG. 3A) to the scheduler 106 in FIG. 1.

The scheduler 106 determines which incoming cells will be switched to output ports 101A–101P based on the cell headers, as described below with reference to FIGS. 4–9. The scheduler 106 sends request grant information back to the port scheduler 208 in FIG. 2. The link receiver 200 in FIG. 2 also sends the cells to the first buffer 204, where the cells are temporarily stored in a queue until the scheduler 106 (FIG. 1) determines which incoming cells will be switched to output ports 101A–101P.

Figure 3B:
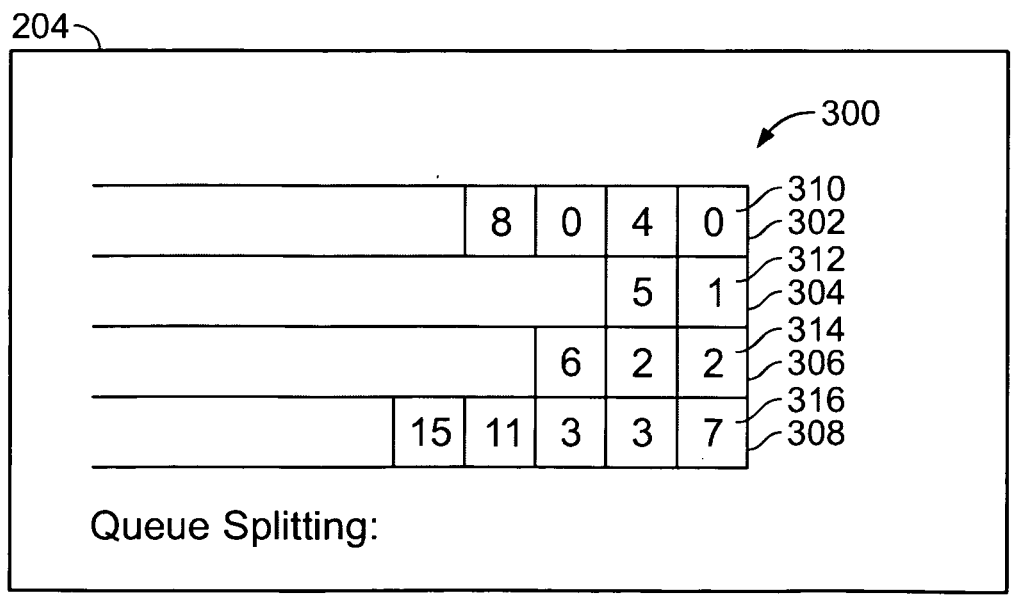
FIG. 3B illustrates one embodiment of a queue in a first buffer in the port processor of FIG. 2.

FIG. 3B illustrates one embodiment of a queue 300 comprising multiple sub-queues 302, 304, 306, 308 in the first buffer 204 of FIG. 2. Multiple sub-queues 302, 304, 306, 308 (FIG. 3B) may reduce the number of contentions between cell headers in the scheduler 106 (FIG. 1), as described below with reference to FIG. 4. In FIG. 3B, there are four sub-queues 302, 304, 306, 308, but other embodiments may select or configure any suitable number of sub-queues.

The first buffer 204 in FIG. 2 routes each incoming cell from the link receiver 200 into one of the four sub-queues 302, 304, 306, 308 (FIG. 3B) based on the destination port address field 332 (FIG. 3A) of each cell. In FIG. 3B, the first sub-queue 302 stores cells with '00' as the last two bits of their destination port addresses, such as cells with destination addresses of 8 ('1000'), 0 ('0000') and 4 ('0100'). The second sub-queue 304 stores cells with '01' as the last two bits of their destination port addresses, such as cells with destination addresses of 5 ('0101') and 1 ('0001'). The third sub-queue 306 stores cells with '10' as the last two bits of their destination port addresses, such as cells with destination addresses of 6 ('0110') and 2 ('0010'). The fourth sub-queue 308 stores cells with '11' as the last two bits of their destination port addresses, such as cells with destination addresses of 15 ('1111'), 11 ('1011'), 3 ('0011') and 7 ('0111').

In other embodiments, the first buffer 204 in FIG. 2 routes each incoming cell into one of the four sub-queues 302, 304, 306, 308 (FIG. 3B) based on the first two bits or middle two bits of the destination port address field 332 (FIG. 3A) of each cell.

When the port scheduler 208 (FIG. 2) receives request grant information from the scheduler 106 (FIG. 1), the port scheduler 208 (FIG. 2) instructs the first buffer 204 to send a cell from one of the four sub-queues 302, 304, 306, 308 (FIG. 3B) to the switch transmitter 212 (FIG. 2). The switch transmitter 212 transmits cells to the switch fabric 104 (FIG. 1), and the switch receiver 214 (FIG. 2) receives cells from the switch fabric 104 (FIG. 1).

The RROM 210 in FIG. 2 stores a plurality of randomization permutations or entries. In one embodiment, the RROMs 210 (FIG. 2) in all of the port processors 102A–102P of FIG. 1 have the same randomization permutations. Also, the RROM 210 in each port processor 102 may have the same randomization permutations as a RROM 608 (FIG. 6) in each randomizer 500 (FIG. 5) of the scheduler 106 (FIG. 1), as described below. Manufacturing costs for this embodiment may be reduced because the same RROM is implemented in all of the port processors 102A–102P (FIGS. 1 and 2) and all of the randomizers 500A–500D (FIG. 5) of the scheduler 106 (FIG. 1). In another embodiment, the randomization permutations in the RROM 210 (FIG. 2) of the port processors 102A–102P (FIG. 1) are different than the randomization permutations in the RROM 608 (FIG. 6) in the randomizers 500A–500D (FIG. 5) of the scheduler 106 (FIG. 1).

Figure 6:
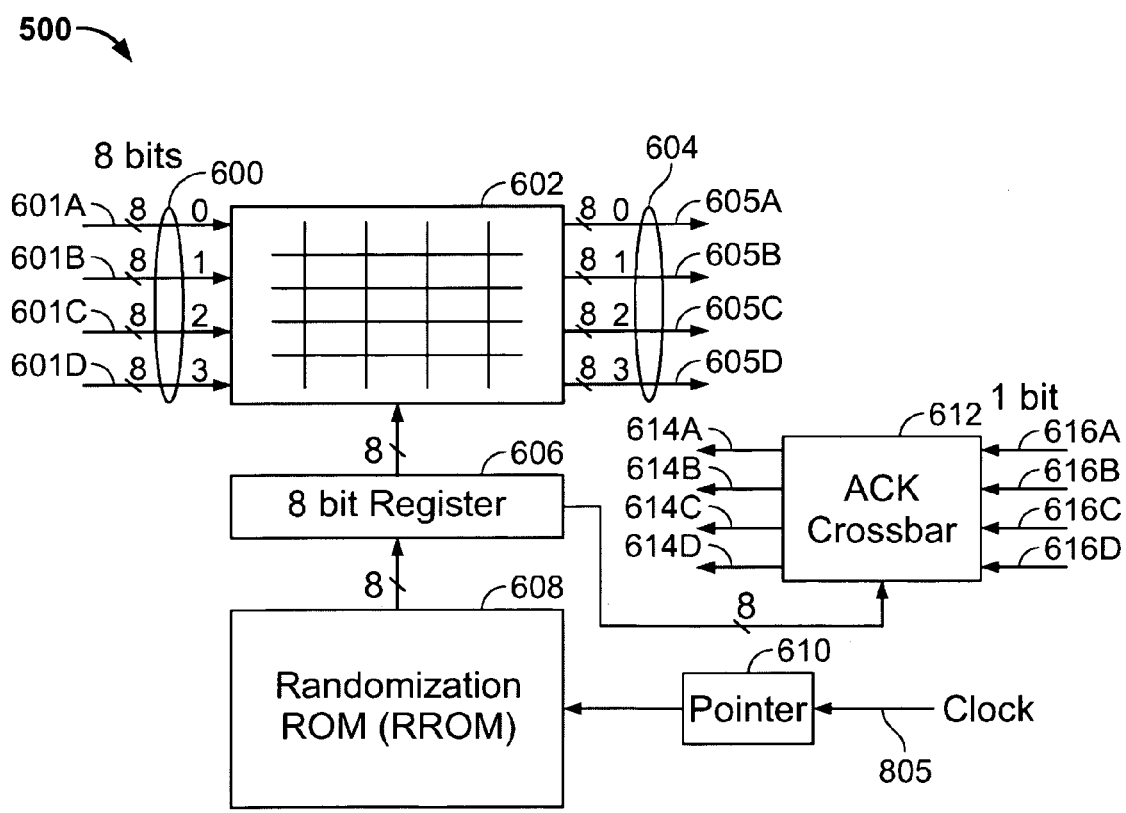
FIG. 6 illustrates one embodiment of a randomizer in the scheduler's switch fabric of FIG. 5.

The RROM 210 in FIG. 2 and the RROM 608 in FIG. 6 may each store any number of randomization permutations, such as 64, 100 or 128 randomization permutations. In one embodiment, the RROM 210 (FIG. 2) and the RROM 608 (FIG. 6) each store several hundred permutations.

The pointer 216 (FIG. 2) in each port processor 102 (FIG. 1) is synchronized with a pointer 610 (FIG. 6) in one of the randomizers 500A–500D (FIG. 5), as described below. The synchronized pointers 216 (FIG. 2), 610 (FIG. 6) allow each routing module 903 (FIG. 9A) in the first stage 910 of the switch fabric 104 to route cells in the same manner as a corresponding randomizer 500 (FIG. 5) routes cell headers in the scheduler 104 (FIG. 1). For example, the second routing module 903B (FIG. 9A) routes cells in the same order as the second randomizer 500A (FIG. 5) routes cell headers.

Figure 4:
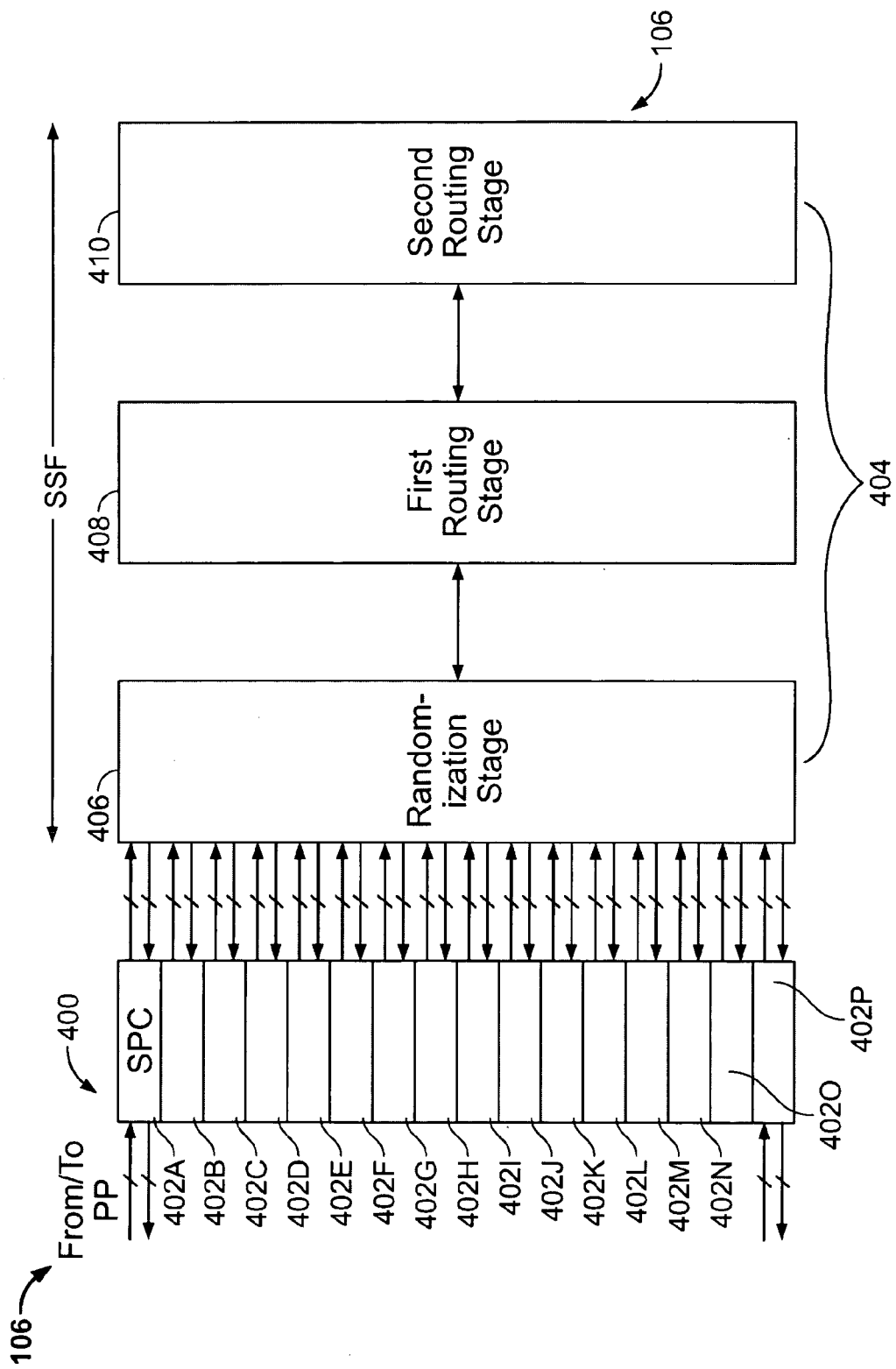
FIG. 4 illustrates one embodiment of the scheduler in the switch architecture of FIG. 1.

Each pointer 610 (FIG. 6) in a randomizer 500 (FIG. 5) of the scheduler 106 (FIG. 1) selects one of the randomization permutations from the RROM 608 (FIG. 6) at the beginning of each request-grant cycle 808 (FIG. 8) to send to a register 606 (FIG. 6). A crossbar/switching network 602 uses the selected randomization permutation in the register 606 to randomly route cell headers on input lines 601A–601D to output lines 605A–605D. Each randomization permutation minimizes bottlenecks caused by multiple input cells headers intended for the same routing module 502 (FIG. 5) in a first routing stage 408 of the scheduler 106 (FIG. 4). Each randomization permutation in the RROM 210 (FIG. 2) and the RROM 608 (FIG. 6) represents a random permutation, which is a one-to-one mapping between the input lines 601A–601D (FIG. 6) and the output lines 605A–605D of a randomizer 500.

When a cell is ready to be sent by a port processor 102 (FIG. 1) to the switch fabric 104, the port processor 104 will first retrieve an entry from the RROM 210. Two bits in the entry represent an output line of a first-stage routing module 903 (FIG. 9A), which performs the randomization function. The port processor 102 (FIG. 1) appends the two bits to the destination port address field 332 (FIG. 3A) of each cell. Each routing module 903 (FIG. 9A) in the first stage 910 of the switch fabric 104 (FIG. 1) uses the two bits to route cells from input lines 901 (FIG. 9A) to output lines 905.

Each randomization sequence in the RROM 210 (FIG. 2) and the RROM 608 (FIG. 6) may comprise any suitable number of bits. In one embodiment, each entry in the RROM 210 (FIG. 2) and the RROM 608 (FIG. 6) comprises eight bits (four output addresses and each has two bits). An 8-bit randomization permutation allows a randomizer 500 (FIG. 5) in the scheduler 106 (FIG. 1) to randomly route four cell headers on four input lines 600 (FIG. 6) of the crossbar/switching network 602 to four output lines 604. The eight bits comprises four pairs of bits, and each pair designates a different output line 605. For example, a randomization permutation of 10011100 (2, 1, 3, 0) instructs a randomizer 500 (FIG. 6) to route a first cell header on a '0' input line 01A to the '2' output line 605C, a second cell header on the '1' input line 601B to the '1' output line 605B, a third cell header on the '2' input line 601C to the '3' output line 05D, and a fourth cell header on the '3' input line 601D to the '0' output line 605A.

In another embodiment, each permutation entry in the RROM 210 (FIG. 2) and the RROM 608 (FIG. 6) is 24 bits wide to accommodate random routing of eight cells on eight input lines of the crossbar 602 (FIG. 6) to eight output lines. In another embodiment, each permutation in the RROM 210 (FIG. 2) and the RROM 608 (FIG. 6) is 64 bits wide to accommodate random routing of 16 cells on 16 input lines of the crossbar 602 (FIG. 6) to 16 output lines.

Figure 5:
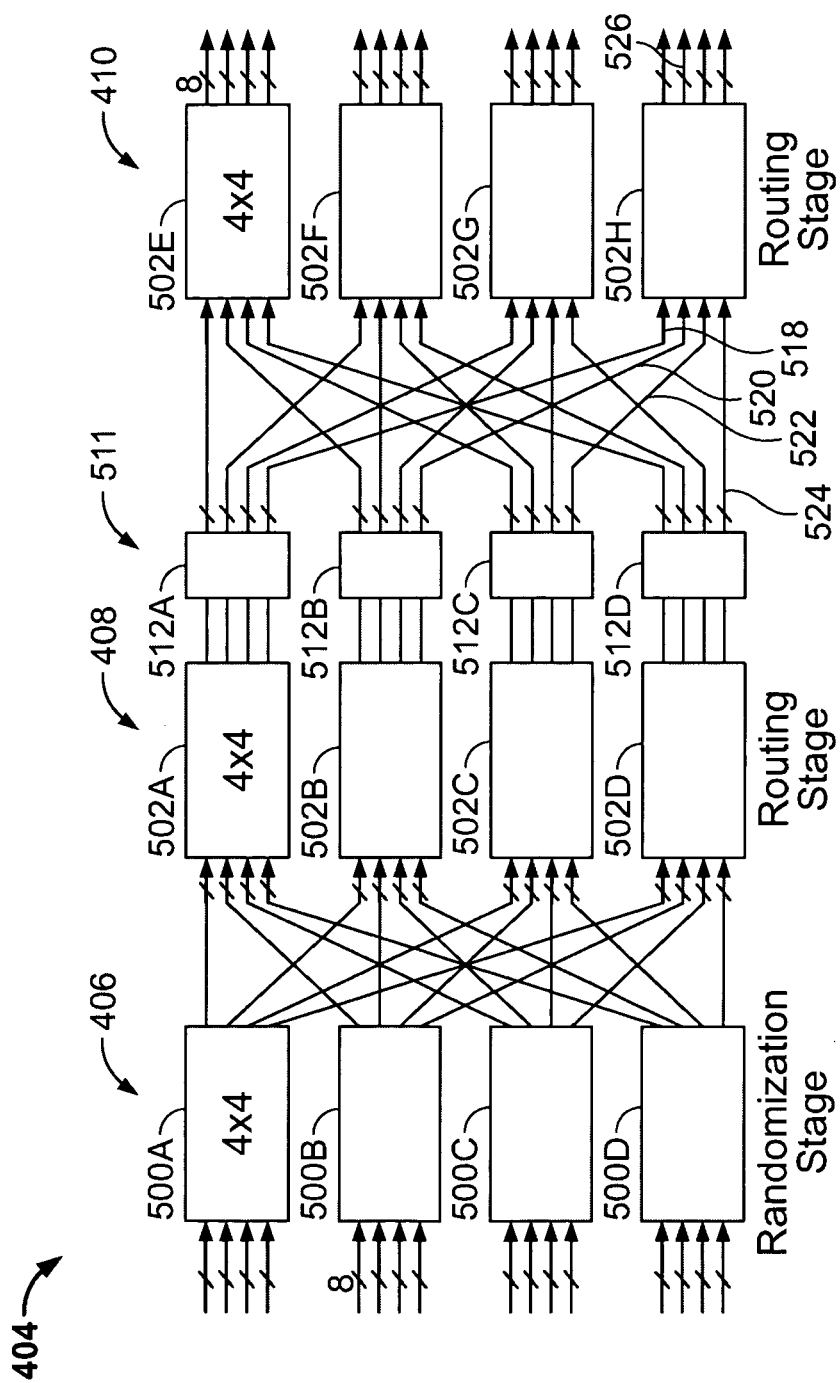
FIG. 5 illustrates one embodiment of a scheduler's switch fabric in the scheduler of FIG. 4.

Each of the 16 port processors 102A–102P in FIG. 1 may have RROMs 210 (FIG. 2) with similar randomization permutations, but the value of the pointers 216 in the port processors 102A–102P (FIG. 1) may be different. For example, the pointers 216 (FIG. 2) in the first set of four port processors 102A–102D in FIG. 1 may have a first pointer value, which is synchronized with the pointer 610 (FIG. 6) in the first randomizer 500A (FIG. 5). The pointers 216 (FIG. 2) in the second set of four port processors 102E–102H in FIG. 1 may have a second pointer value, which is synchronized with the pointer 610 (FIG. 6) in the second randomizer 500B (FIG. 5). The pointers 216 (FIG. 2) in the third set of four port processors 102I–102L in FIG. 1 may have a third pointer value, which is synchronized with the pointer 610 (FIG. 6) in the third randomizer 500C (FIG. 5). The pointers 216 (FIG. 2) in the fourth set of four port processors 102M–102P may have a fourth pointer value, which is synchronized with the pointer 610 (FIG. 6) in the fourth randomizer 500D (FIG. 5).

As described above, the synchronized pointers 216 (FIG. 2), 610 (FIG. 6) allow each routing module 903 in the first stage 910 (FIG. 9) of the switch fabric 104 to route cells in the same order as a corresponding randomizer 500 routes cell headers in the scheduler 106 (FIG. 1).

The switch fabric 104 (FIG. 1) routes cells from the switch transmitter 212 (FIG. 2) of one port processor 102 (FIG. 1) to the switch receiver 214 of another port processor 102. The switch receiver 214 (FIG. 2) in each port processor 102 (FIG. 1) is configured to receive a cell that has been successfully routed by the switch fabric 104 (FIG. 1). The switch receiver 214 (FIG. 2) sends the cell to the second buffer 206 for temporary storage. The line card (not shown) may send a signal to the link transmitter 202 using a protocol, such as Common Switch Interface (CSIX), to indicate that the line card is ready or not ready to receive a cell from the link transmitter 202 via a transmitting portion of the input/output port 101. When the line card is ready, the link transmitter 202 retrieves the cell stored in the second buffer 206 and sends the cell to the line card.

At the end of each time slot (after a cell is switched by the switch fabric 104 (FIG. 1) to a destination port 101A–101P, the pointer 216 (FIG. 2) in each port processor 102 (FIG. 1) is incremented, in the same manner as the pointer 610 (FIG. 6) in each randomizer 500 (FIG. 5) is incremented after each slot. As described above, the contents of the RROMs 608 (FIG. 6), 210 (FIG. 2) are the same and the pointers 610 (FIG. 6), 216 (FIG. 2) are synchronized according to the slot number. This allows the first stage of routing modules 903A–903D (FIG. 9) in the switch fabric 104 to route cells in the same manner as the randomizers 500A–500D (FIG. 5) route cell headers in the scheduler 106.

Scheduler 106

FIG. 4 illustrates one embodiment of the scheduler 106 in the switch architecture 100 of FIG. 1. In one embodiment, the scheduler 106 in FIG. 4 is a single integrated circuit chip. The scheduler 106 in FIG. 4 comprises a set 400 of scheduler port controllers (SPCs) 402A–402P and a scheduler's switch fabric (SSF) 404. The scheduler's switch fabric 404 comprises three stages of crossbars: a randomization stage 406, a first routing stage 408 and a second routing stage 410.

The scheduler 106 in FIG. 4 has 16 scheduler port controllers 402A–402P to correspond with the 16 port processors 102A–102P in FIG. 1. In other embodiments, the scheduler 106 may have more than 16 or less than 16 scheduler port controllers. For example, the scheduler 106 may have 32, 64, 100, 1000 or more scheduler port controllers.

In FIG. 4, each scheduler port controller 402 has four sub-queues (not shown), which are similar to the four sub-queues 310, 312, 314, 316 (FIG. 3B) in a corresponding port processor 102 (FIG. 1), except the sub-queues in the scheduler port controllers 402A–402P (FIG. 4) store cell headers 330 (FIG. 3A). The port scheduler 208 (FIG. 2) of each port processor 102 (FIG. 1) sends cell headers 330 (FIG. 3A) of incoming cells to a corresponding scheduler port controller 402 (FIG. 4) in the scheduler 106. The scheduler port controller 402 stores cell headers 330 (FIG. 3A) in four sub-queues in the same order as the cells stored in the sub-queues 310, 312, 314, 316 (FIG. 3B) of the port processor 102 (FIG. 1). Each scheduler port controller 402 in FIG. 4 sends a cell header 330 (FIG. 3A) from one sub-queue at a time to the randomization stage 406 (FIG. 4) of the scheduler's switch fabric 404.

FIG. 5 illustrates one embodiment of the scheduler's switch fabric 404 in the scheduler 106 of FIG. 4. The randomization stage 406 in FIG. 5 comprises four 4×4 randomizers 500A–500D. In other embodiments, the randomization stage 406 may have more than four or less than four 4×4 randomizers. Also, each randomizer may be configured with more than four or less than four input and output lines. For example, each randomizer may have eight input lines and eight output lines.

The first routing stage 408 comprises four 4×4 routing modules 502A–502D, and the second routing stage 410 comprises four routing modules 502E–502H. Between the first and the second routing stages 408, 410 is a stage of registers 511 that stores the outputs of the first routing stage 408. The stage of registers 511 also provides the inputs for the second routing stage 410. In other embodiments, the first and second routing stages 408, 410 may have more than four or less than four 4×4 routing modules. Also, each routing module may be configured with more than four or less than four input lines and output lines. For example, each routing module in the first and second routing stages 408, 410 may have eight input lines and eight output lines.

The randomization stage 406 of FIG. 5 does not block cell headers 330 (FIG. 3A) from being routed to the first routing stade 408 (FIG. 5). The first and second routing stages 408, 410, however, block certain cell headers 330 (FIG. 3A) according to destination address bits 332 and the priority bits 334 stored in each cell header 330, as described below.

Randomizers 500A–500D

FIG. 6 illustrates one embodiment of a 4×4 randomizer 500 in the scheduler's switch fabric 404 of FIG. 5. The randomizer 500 in FIG. 6 comprises a crossbar/switching network 602, a register 606, a RROM 608, a pointer 610 and a reverse-direction, acknowledgment crossbar 612. The pointer 610, RROM 608, register 606 and crossbar 602 in FIG. 6 operate together to randomly route incoming cell headers 330 (FIG. 3A) from the scheduler port controllers 402A–402P (FIG. 4) on four eight-bit input lines 601A–601D (FIG. 6) to the routing modules 502A–502D (FIG. 5) via four eight-bit output lines 605A–605D (FIG. 6) during an arbitration cycle 808 in FIG. 8. Thus, the cell headers 330 (FIG. 3A) leaving each randomizer 500 (FIG. 5) are evenly distributed among the four routing modules 502A–502D.

The register 606 stores one or more randomization permutations selected by the pointer 610. The register 606 in FIG. 6 is an 8-bit register, but the register 606 may be larger or smaller depending on the size of each randomization permutation stored in the RROM 608. In one configuration, the register 606 comprises two 8-bit registers. The crossbar 602 in FIG. 6 comprises electronic transistors and/or switches that are configured to connect any one of the input lines 601A–601D to any one of the output lines 605A–605D based on a randomization permutation from the register 606.

The contents of the RROM 608 in FIG. 6 for each of the four randomizers 500A–500D (FIG. 5) are preferably the same. The values of the pointers 610 (FIG. 6) in the randomizers 500A–500D (FIG. 5) are preferably different in order to randomly route 16 cells coming into the randomization stage 406 to the first routing stage 408.

For example, the first three randomization permutations in two RROMs 608 (FIG. 6) of two randomizers 500A, 500B (FIG. 5) may be 00100111 (0, 2, 1, 3), 10011100 (2, 1, 3, 0) and 11100100 (3, 2, 1, 0). During a first request-grant cycle 808 (FIG. 8), a pointer 610 (FIG. 6) in the first randomizer 500A (FIG. 5) points to the first randomization permutation, while a pointer 610 (FIG. 6) for the second randomizer 500B (FIG. 5) points to the second randomization permutation. During a second request-grant cycle (FIG. 8), the pointer 610 (FIG. 6) in the first randomizer 500A (FIG. 5) points to the second randomization permutation, while the pointer 610 (FIG. 6) for the second randomizer 500B (FIG. 5) points to the third randomization permutation.

The matching contents of the RROMs 608 (FIG. 6), 210 (FIG. 2) and the synchronized pointers 610 (FIG. 6), 216 (FIG. 2) allow the first stage of routing modules 903A–903D in the switch fabric 104 (FIG. 9) to route cells in the same manner as the randomizers 500A–500D (FIG. 5) route cell headers in the scheduler 106.

The acknowledgment crossbar 612 routes a one-bit acknowledgment signal from an acknowledgment crossbar 716 (FIG. 7A) in a routing module 500 (FIG. 5) to a scheduler port controller 402 (FIG. 4) after a cell header 330 (FIG. 3A) has successfully passed through the first and second routing stages 408, 410 (FIG. 5). The acknowledgment crossbar 612 comprises electronic transistors and/or switches that are configured to connect any one of four one-bit input lines 616A–616D to any one of four one-bit output lines 614A–614D based on the randomization permutation in the register 606. For efficiency, the acknowledgment crossbar 716 in FIG. 7A will be used to describe acknowledgment crossbars in the routing modules 502A–502H (FIG. 5) of both the first and second routing stages 408, 410 below.

Routing Modules 502A–502H

Figure 7A:
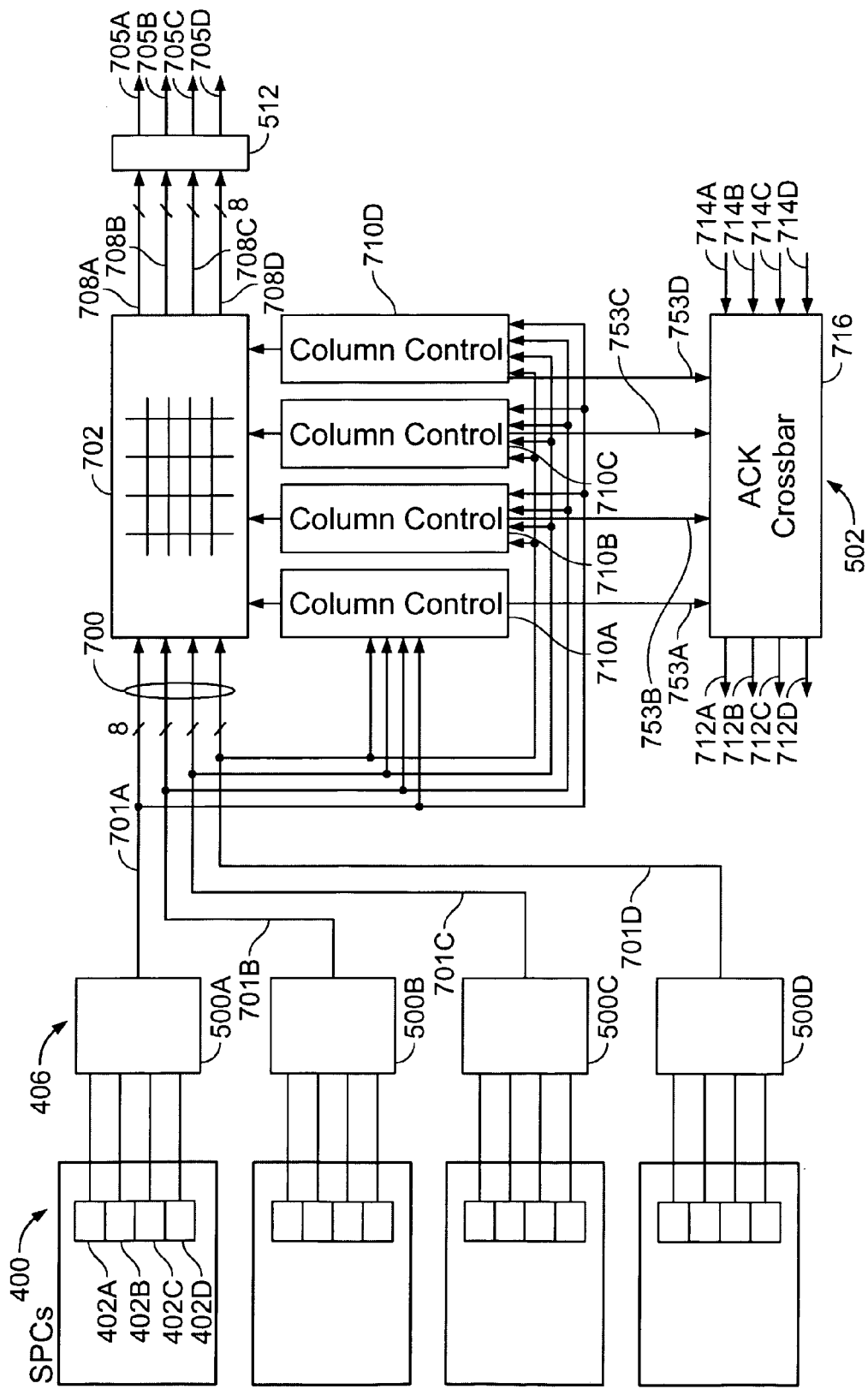
FIG. 7A illustrates one embodiment of a routing module in the scheduler's switch fabric of FIG. 5.

FIG. 7A illustrates one embodiment of a 4×4 routing module 502 within the first and second routing stages 408, 410 in FIG. 5. The routing module 502 in FIG. 7A comprises a routing crossbar/switching network 702, four column control units 710A–710D and a reverse-direction, acknowledgment (ACK) crossbar 716. The incoming cell headers on input lines 701A–701D come from different SPCs 402 (FIG. 4) as determined by the randomizers 500A–500D (FIG. 5). The cell headers are stored in the SPCs 402 (FIG. 4) until the column control units 710A–710D (FIG. 7A) in a routing module 502 (FIG. 5) of the first routing stage 408 examine the destination addresses 332 (FIG. 3A) of the cell headers and resolve any contentions. If one or more cell headers are granted access, the column control units 710A–710D (FIG. 7A) activate the routing crossbar 702. The corresponding SPCs 402 (FIG. 4) will then send one or more cell headers through the randomizers 500A–500D (FIG. 5), the activated crossbar 702 (FIG. 7A) and the four eight-bit input lines 701A–701D to a register 512.

The routing crossbar 702 in FIG. 7A comprises electronic transistors and/or switches that are configured to connect one or more of the input lines 701A–701D to one or more of the output lines 708A–708D based on the destination address bits 332 (FIG. 3A), priority bits 334 and valid/invalid bit 336 in each cell header 330. In one embodiment, the crossbar 702 (FIG. 7A) is a combination circuit. The routing crossbar 702 in a routing module 502 (FIG. 5) in the first routing stage 408 transfers one or more cell headers via four eight-bit output lines 708A–708D (FIG. 7A) to a register 512. The register 512 buffers outgoing cell headers until a routing module 502 (FIG. 5) in the second stage 410 is ready to receive the cell headers.

The four column control units 710A–710D (FIG. 7A) also control the acknowledgment crossbar 716 for routing an acknowledgment signal, as described below. The acknowledgment crossbar 716 comprises electronic transistors and/or switches that are configured to connect one or more one-bit input lines 714A–714D to one or more one-bit output lines 712A–712D as determined by the column control units 710A–710D.

Figures 1, 7B:
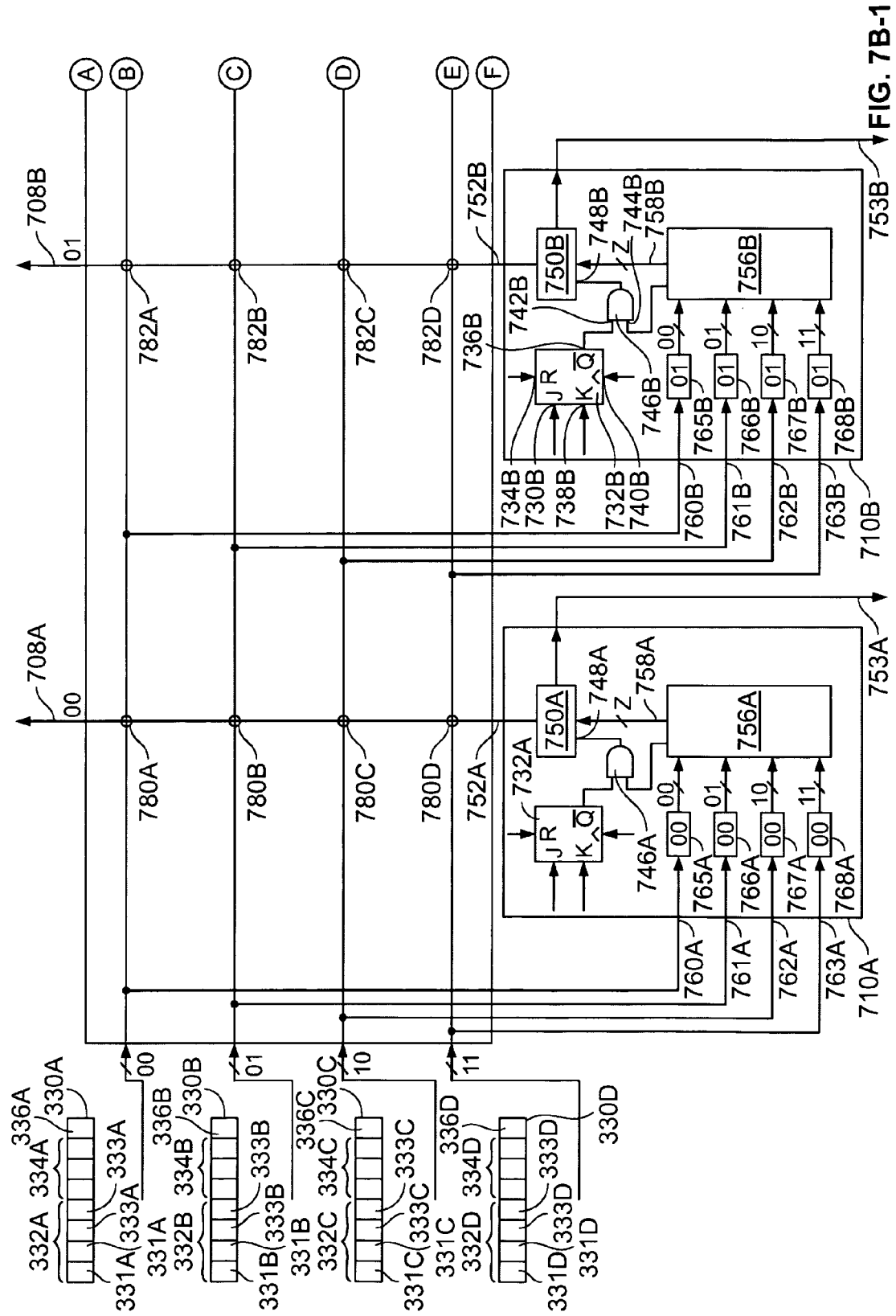
FIG. 7B illustrates one embodiment of a routing crossbar and a plurality of control units of FIG. 7A.
Figures 2, 7B:
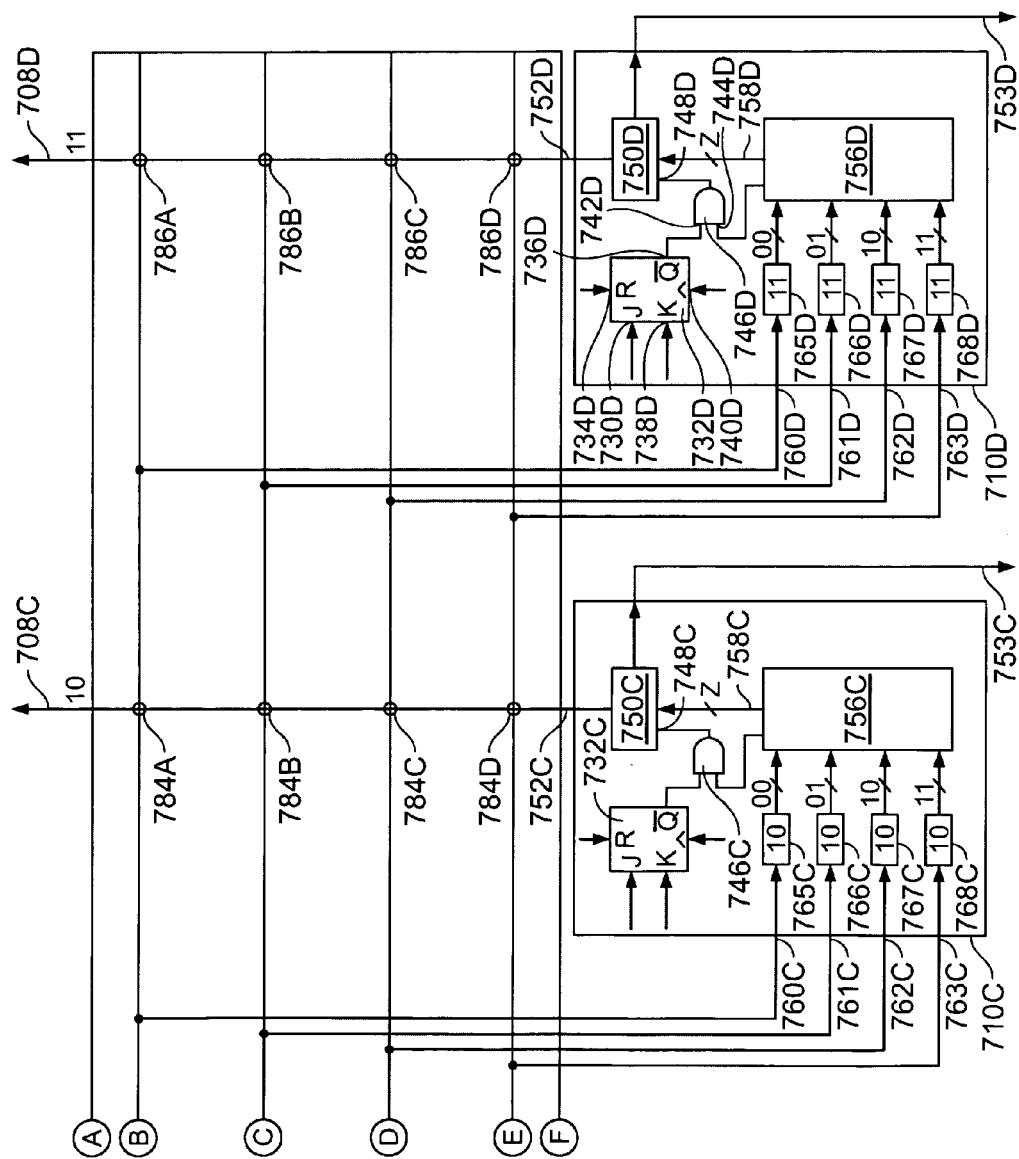
Figure 8:
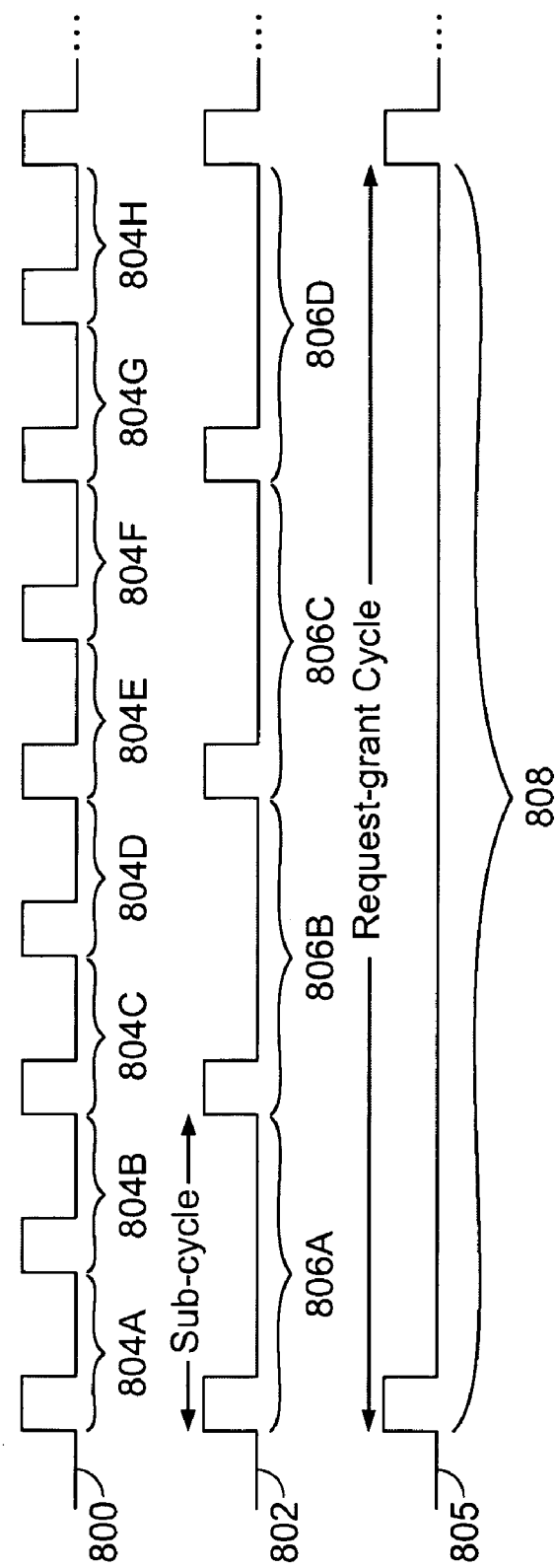
FIG. 8 illustrates one embodiment of three clock signals used by the scheduler of FIG. 4.

FIG. 7B illustrates one embodiment of the routing crossbar 702 and the control units 710A–710D of FIG. 7A. The routing module 502 (FIG. 7A) may receive cell headers 330A–330D (FIG. 7B) with destination addresses 332A–332D that have the same first or last two bits 331A–331D, 333A–333D. A 'contention' occurs when two or more cell headers 330A–330D on two or more input lines 701A–701D have the same first or last two bits 331A–331D, 333A–333D in their destination addresses 332A–332D in a given clock cycle 804 (FIG. 8). Each of the column control units 710A–710D in FIG. 7B prevents a 'contention' between two or more cell headers 330A–330D from becoming a 'collision' by performing arbitration. Each column control unit 710 receives four cell headers 330A–330D via four input lines 701A–701D, but outputs only one cell header 330, or no cell header 330 if there is no match, on a particular output line 708 in a given clock cycle 804 (FIG. 8).

Figure 7C:
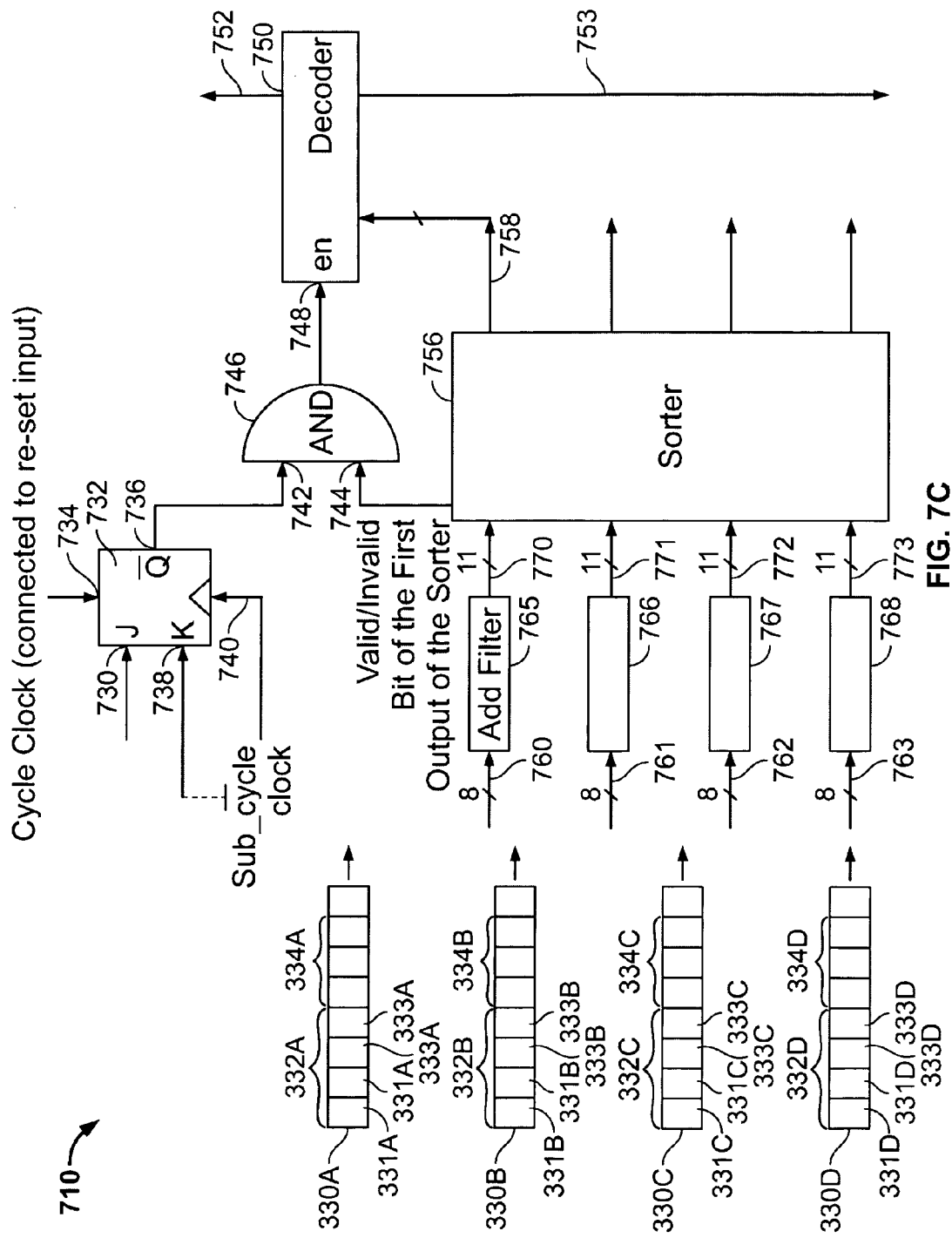
FIG. 7C illustrates one embodiment of a column control unit in the routing module of FIG. 7A.

FIG. 7C illustrates one embodiment of a column control unit 710 in the routing module 502 of FIG. 7A. The control unit 710 in FIG. 7C comprises a JK flip-flop 732, an AND gate 746, a decoder 750, four address matching filters 765–768 and a sorter 756. The decoder 750 in FIG. 7C controls a set of crosspoints 780A–780D, 782A–782D, 784A–784D and 786A–786D (FIG. 7B) of one of the output lines 708A–708D and a set of crosspoints (not shown) of one of the output lines 712A–712D (FIG. 7A) of the acknowledgment crossbar 716. A 'crosspoint' comprises one or more physical or logical contacts that operate together to transmit signals. For example, the decoder 750A (FIG. 7B) in the first column control unit 710A controls a first set of crosspoints 780A–780D of the first output line 708A and a first set of crosspoints (not shown) of the first output line 712B (FIG. 7A) of the acknowledgment crossbar 716.

In one embodiment, the sorter 756 is a 4×4 bitonic sorter comprising a combination circuit. The sorter 756 is implemented with hardware for speed. The operation of the control unit 710 in FIG. 7C is described with reference to FIGS. 7A, 7B, and 8.

Request-Grant Cycle 808

FIG. 8 illustrates one embodiment of three different clock signals 800, 802, 805 used by the scheduler 106 of FIG. 4. The first clock signal 800 in FIG. 8 has a plurality of basic clock cycles 804A–804H which are used by the routing modules 502A–502H (FIG. 5) to route cell headers 330 (FIG. 3A). During each clock cycle 804, each column control unit 710 in the routing module 502 (FIG. 5) performs a request-grant arbitration between incoming cell headers 330A–330D (FIG. 7B). There can be up to four cell headers 330A–330D reaching the output lines 708A–708D. For example, if there is no contention between four incoming cell headers 330A–330D, the routing module 502 outputs four cell headers 330A–330D via output lines 708A–708D at the end of a clock cycle 804 (FIG. 8).

If two cell headers (such as the first and second cell headers 330A, 330B in FIG. 7B) are contending for one output line (such as the third output line 708C), the column control unit (710C) corresponding to that output line (708C) resolves the contention during a clock cycle 804 (FIG. 8). The routing module 502 (FIG. 7B) outputs one of the contending cell headers (330A or 330B) on the output line (708C) and the other two non-contending cell headers (330C, 330D) on two of the other three output lines (708A, 708B, 708D) at the end of the clock cycle 804 (FIG. 8).

If three cell headers (such as the first, third and fourth cell headers 330A, 330C, 330D in FIG. 7B) are contending for one output line (such as the second output line 708B), the column control unit (710B) corresponding to that output line (708B) resolves the contention during a clock cycle 804 (FIG. 8). The routing module 502 (FIG. 7B) outputs one of the contending cell headers (330A, 330C, or 330D) on the output line (708B) and the non-contending cell header (330B) on one of the other three output lines (708A, 708C or 708D) at the end of the clock cycle 804 (FIG. 8).

If all four cell headers 330A–330D in FIG. 7B are contending for one output line (such as the second output line 708B), the column control unit (710B) corresponding to that output line (708B) resolves the contention during a clock cycle 804 (FIG. 8). The routing module 502 (FIG. 7B) outputs one of the contending cell headers (330A, 330B, 330C or 330D) on the output line (708B) at the end of the clock cycle 804 (FIG. 8).

If two cell headers (such as the first and third cell headers 330A, 330C in FIG. 7B) are contending for one output line (such as the second output line 708B) and the other two cell headers (such as the second and fourth cell headers 330B, 330D) are contending for another output line (such as the third output line 708C), the column control units (710B, 710C) corresponding to those output lines (708B, 708C) resolve the contentions during a clock cycle 804 (FIG. 8). The routing module 502 (FIG. 7B) outputs one of the first two contending cell headers (330A or 330C) on one output line (708B) and one of the second two contending cell headers (330B or 330D) on the other output line (708C) at the end of the clock cycle 804 (FIG. 8).

The second clock signal 802 in FIG. 8 has a plurality of scheduling request-grant sub-cycles 806A–806D. Each request-grant sub-cycle 806 in FIG. 8 represents an end-to-end set up time for a cell header 330 (FIG. 3A) to pass through the scheduler's switch fabric 404 (FIG. 4).

The third clock signal 805 in FIG. 8 has a total request-grant time cycle 808, during which the scheduler 106 (FIG. 4) schedules up to 16 cells to be transferred between the port processors 102A–102P (FIG. 1), depending on the number of contentions between the incoming cell headers 330 (FIG. 3A). The total request-grant cycle 808 in FIG. 8 comprises four request-grant sub-cycles 806A–806D during which the scheduler's switch fabric 404 (FIG. 4) performs up to four rounds of arbitrations. In one embodiment, the request-grant cycle is 20 nanoseconds. With multiple request-grant arbitrations in multiple sub-cycles 806A–806D (FIG. 8), the scheduler 106 (FIG. 4) can achieve a very high throughput.

In another embodiment, the scheduler's switch fabric 404 (FIG. 4) performs eight rounds of request-grant arbitrations in one request-grant cycle 808 (FIG. 8) with eight sub-cycles. Each request-grant cycle equals sixteen clock cycles 804 of the basic clock signal 800. In this embodiment, each scheduler port controller 402 (FIG. 4) splits incoming cell headers 330 (FIG. 3A) from a port processor 102 (FIG. 1) into eight sub-queues (not shown) in the scheduler port controller 402.

In operation, at the beginning of a first request-grant sub-cycle 806A (FIG. 8), each of the scheduler port controllers 402A–402P (FIG. 4) transmits a first cell header 330 (FIG. 3A) from one of the four sub-queues (not shown) in each scheduler port controller 402 (FIG. 4) to a randomizer 500 (FIG. 5) in the scheduler's switch fabric 404. The randomizers 500A–500D of the scheduler's switch fabric 404 receives 16 cell headers 330 (FIG. 3A) and randomly routes the 16 cell headers 330 to the routing modules 502A–502D (FIG. 5) of the first stage 408.

Each of the routing modules 502A–502D in the first routing stage 408 is configured to receive four cell headers 330A–330D (FIG. 7B) from four different SPCs 402 (FIG. 4) through randomizers 500A–500D (FIG. 5). The cell headers 330A–330D (FIG. 7B) are buffered in the four different SPCs 402. Depending on the arbitration success rate of the first 16 cell headers 330, each of the routing modules 502E–502H (FIG. 5) in the second routing stage 410 may receive one to four cell headers 330A–330D (FIG. 7B) from the four routing modules 502A–502D (FIG. 5) of the first stage 408.

In each routing module 502 (FIG. 5), the address matching filters 765A–768A, 765B–768B, 765C–768C, 765D–768D (FIG. 7B) receive cell headers 330A–330D via four eight-bit input lines 760A–763A, 760B–763B, 760C–763C, 760D–763D, which are coupled to the four eight-bit input lines 701A–701D of the crossbar 702. The address matching filters 765A–768A, 765B–768B, 765C–768C, 765D–768D in each of the routing modules 502A–502D (FIG. 5) of the first routing stage 408 examine the first two bits 331A–331D (FIG. 7B) of the destination address fields 332A–332D of the cell headers 330A–330D to determine whether a cell header 330 is intended to be output on a particular output line 708. If the cell has an asserted VALID bit 336 and the first two bits 331 of a destination address field 332 match an address stored in one of the filters 765A–768A, 765B–768B, 765C–768C, 765D–768D, the filter passes the cell header 330 to a corresponding sorter 756.

Similarly, the address matching filters 765A–768A, 765B–768B, 765C–768C, 765D–768D (FIG. 7B) in each of the routing modules 502E–502H (FIG. 5) of the second routing stage 410 examine the last two bits 333A–333D (FIG. 7B) of the destination address fields 332A–332D. If the last two bits 333 of a destination address field 332 match an address stored in one of the filters 765A–768A, 765B–768B, 765C–768C, 765D–768D, the filter passes the cell header 330 to a corresponding sorter 756.

In one example, the input lines 701A–701D (FIG. 7B) of a routing module 502 (FIG. 5) receive four cell headers 330A–330D ('11000101,' '10001001,' '11011011' and '0111101'). The first four bits from the left of each cell header 330 are destination address bits 332. The next three bits from the left are priority bits 334, and the last bit is a VALID/INVALID bit 336. If the four cell headers 330A–330D above are received by a routing module 502 in the first routing stage 408 (FIG. 5), then the first and third cell headers 330A, 330C (FIG. 7B) are contending for the fourth output line 708D because the first two bits 331A, 331C of their destination addresses 332A, 332C are '11.' If the routing module 502 is in the second stage 410 (FIG. 5), then the first and second cell headers 330A, 330B (FIG. 7B) are contending for the first output line 708A because the last two bits 333A, 333B of their destination addresses 332A, 332B are '00.' Assuming the second routing module 502B (FIG. 5) in the first routing stage 408 receives the ('11000101,' '10001001,' '11011011' and '0111101') cell headers, the first and third cell headers 330A, 330C (FIG. 7B) are contending for the fourth ('11') output line 708D of the routing module 502. The fourth column control unit 710D controls the fourth ('11') output line 708D. The four address matching filters 765D–768D in the fourth column control unit 710D receive the four cell headers 330A–330D via input lines 760D–763D, respectively. The first and third address matching filters 765D, 767D append a MATCH bit of '1' to the first and third cell headers 330A, 330C to indicate a valid match. The second and fourth address matching filters 766D, 768D append a MATCH bit of '0' to the second and fourth cell headers 330B, 330D to indicate that there is no match (the second and fourth cell headers 330B, 330D do not have '11' as the first two bits 331B, 331D of their destination addresses 332B, 332D).

In addition, the address matching filters 765D–768D append two-bit addresses of the input lines 701A–701D that carried the cell headers 330A–330D. Thus, each of the address matching filters 765D–768D output 11 bits (8-bit header 330, a MATCH bit and a two-bit address) to the sorter 756D. The four outputs comprise '11000101100,' '10001001001,' '11011011110' and '0111101011.'

The sorter 756D in FIG. 7B sorts the outputs of the four address matching filters 765D–768D from highest to lowest priority by comparing the appended MATCH bits and the priority bits 334A–334D of the cell headers 330A–330D. The MATCH bits and the priority bits 334A–334D from the four address matching filters 765D–768D are '1010,' '0100,' '1101' and '0101,' respectively. The sorter 756D sorts the four outputs to be '11011011110,' '11000101100,' '0111101011' and '10001001001.' The output ('11011011110') from the third address matching filter 767D has the highest priority. The sorter 756D outputs the line address bits ('10') of the output ('11011011110') from the third address matching filter 767D to the decoder 750D. The sorter 756D discards the other three outputs of '11000101100,' '0111101011' and '10001001001.'

If none of the four input cell headers 330A–330D in FIG. 7B have address bits that match the address matching filters 765D–768D of the fourth control unit 710D, the control unit 710D discards the four cell headers 330A–330D and waits for subsequent cell headers on the input lines 701A–701D at the beginning of the next clock cycle 804 in FIG. 8.

Continuing with the example above, the sorter 756D also outputs the VALID/INVALID bit 336C of the cell header 330C to an input port 744D of the AND gate 746D. If the VALID/INVALID bit 336C is '0,' then the cell header 330C is invalid and the decoder 750D does not activate any crosspoints. In this example, the VALID/INVALID bit 336C of the '11011011' cell header 330C is '1.'

Initially, a J input port 730D (FIG. 7B) of the JK flip-flop 732D receives a low level logic signal ('0'). A K-input port 738D is always connected to ground ('0'). The Q output 732D of the JK flip-flop 732D is reset to '0' by the third clock signal 805 (FIG. 8) via the reset input port 734D (FIG. 7B) periodically. Thus, the Q output port 736D of the JK flip-flop 732D outputs a high level logic signal ('1') to an input port 742D of the AND gate 746D. Both input ports 742D, 744D of the AND gate 746D receive high level logic signals ('1'), and the AND gate 746D outputs a high level logic signal ('1') to an ENABLE input port 748D of the decoder 750D.

With a high level logic signal ('1') at the ENABLE port 748D, the decoder 750D uses the line address bits ('10') from the sorter 756D to connect/activate the third crosspoint 786C of the fourth output line (column) 708D in the crossbar 702 via line 752D. The crossbar 702 routes the third cell header 330C ('11011011') from the third input line 701C to the fourth output line 708D, which is coupled to the second input line 701B of the fourth routing module 502H (FIG. 5) in the second routing stage 410. The register 511 (FIG. 7A) between the first stage routing module and the second routing module (FIG. 5) will buffer the third cell header 330C ('11011011').

The enabled decoder 750D also uses the line address bits ('10') from the sorter 756D to activate a crosspoint (not shown) in the acknowledgment crossbar 716 (FIG. 7A) via line 753D (FIG. 7B) to connect a fourth input line 714D (FIG. 7A) to a third output line 712C. Thus, the decoders 750A–750D (FIG. 7B) are configured to activate crosspoints of the acknowledgment crossbar 716 (FIG. 7A) that are opposite to (a mirror image of) the crosspoints 780A–780D, 782A–782D, 784A–784D, 786A–786D (FIG. 7B) of the routing crossbar 702.

The second input line 520 (FIG. 5) of the fourth routing module 502H of the second routing stage 410 receives the '11011011' cell header from the second routing module 502B of the first stage 408. The second two bits ('01') of the destination address in the '11011011' cell header indicates that the cell header is intended for the second output line 526 of the fourth routing module 502H of the second routing stage 410.

The fourth routing module 502H may also receive cell headers 330A, 330C, 330D (FIG. 7B), which have '01' as the last two destination address bits 333A, 333C, 333D, from the first, third and fourth routing modules 502A, 502C, 502D (FIG. 5) of the first stage 408 via input lines 518, 522 and 524, respectively, during the same cycle 804 (FIG. 8). In this case, there is a contention for the second output line 526 (FIG. 5) of the fourth routing module 502H of the second routing stage 410.

The second control unit 710B (FIG. 7B) in the fourth routing module 502H (FIG. 5) resolves any contention between the '11011011' cell header on the second input line 520 and any other cell headers 330A, 330C, 330D on input lines 518, 522 and 524 intended for the second output line 526. If the '11011011' cell header has a higher priority than the other cell headers 330A, 330C, 330D intended for the second output line 526, then the decoder 750B in the second control unit 710B will connect the second crosspoint 782B of the second output line 708B.

Acknowledgment Signal

Each output line 708 (FIG. 7B) of each routing module 502 (FIG. 5) in the second stage 410 (FIG. 4) is connected to a SPC 402. Thus, when a cell header 330 (FIG. 7B) reaches an output line 708 of a routing module 502 (FIG. 5) in the second routing stage 410, the cell header reaches a destination port's SPC 402 (FIG. 4). The SPC 402 of the destination port will send an acknowledgment signal to the port processor 102 (FIG. 1) that originally sent the cell header.

Using the example above, the decoder 750B (FIG. 7B) of the fourth routing module 502H (FIG. 5) of the second routing stage 410 activates a crosspoint (not shown) in the acknowledgment crossbar (such as the acknowledgment crossbar 716 in FIG. 7A) of the fourth routing module 502H (FIG. 5) between the second input line 714B (FIG. 7A) and the second output line 712B. The decoder 750B (FIG. 7B) transmits a one-bit acknowledgment signal from the second input line 714B (FIG. 7A) of the acknowledgment crossbar 716 through the activated crosspoint to the second output line 712B.

The second output line 712B of the acknowledgment crossbar 716 in the fourth routing module 502H (FIG. 5) of the second stage 410 is coupled to the fourth input line 714D (FIG. 7A) of the acknowledgment crossbar 716 in the second routing module 502B (FIG. 5) of the first routing stage 408. As described above, the second routing module 502B (FIG. 5) in the first routing stage 408 originally routed the '11011011' cell header to the fourth routing module 502H in the second routing stage 410. The acknowledgment signal is transmitted from the fourth input line 714D (FIG. 7A) of the acknowledgment crossbar 716 in the second routing module 502B (FIG. 5) in the first routing stage 408 to the third output line 712C (FIG. 7A) via an activated crosspoint described above.

The acknowledgment signal is transmitted from the third output line 712C of the acknowledgment crossbar 716 in the second routing module 502B (FIG. 5) in the first routing stage 408 to the second input line 616B (FIG. 6) of the acknowledgment crossbar 612 of the third randomizer 500C (FIG. 5). The third randomizer 500C originally routed the '11011011' cell header to the second routing module 502B in the first routing stage 408 because the second routing module 502B received the '11011011' cell header on the third input line 701C (FIG. 7B). The third randomizer 500C (FIG. 5) transmits the acknowledgment signal to the scheduler port controller 402 (FIG. 4) that originally sent the '11011011' cell header to the randomizer 500C (FIG. 5).

The acknowledgment signal informs the scheduler port controller 402 (FIG. 4) that any contentions between the '11011011' cell header and other cell headers were resolved by the routing modules 502A–502H (FIG. 5), and the '11011011' cell header has been given a transmission request grant. The scheduler port controller 402 (FIG. 4) temporarily records the acknowledgment signal. At the end of a request-grant cycle 808 (FIG. 8), the scheduler port controller 402 (FIG. 4) transmits request grant information (based on the acknowledgment signal) to the port processor 102 (FIG. 1) that originally sent the '11011011' cell header to the scheduler port controller 402 (FIG. 4).

Locking A Control Unit 710

The acknowledgment signal also locks the fourth column control unit 710D (FIG. 7B) in the second routing module 502B (FIG. 5) of the first stage 408 and the second control unit 710B (FIG. 7B) in the fourth routing module 502H (FIG. 5) of the second routing stage 410 where the '11011011' cell header passed. Each locked column control unit 710 (FIG. 7B) prevents subsequent cell headers sent by one of the scheduler port controllers 402A–402P (FIG. 4) during subsequent sub-cycles 806 (FIG. 8) from being routed through the same output line 708 (FIG. 7B) as the '11011011' cell header. Each locked column control unit 710 (FIG. 7B) also prevents subsequent acknowledgment signals from being routed through the same output line 712 (FIG. 7A) of the acknowledgment crossbar 716. Each locked column control unit 710 remains locked for the remainder of the request-grant cycle 808 (FIG. 8).

Using the example above, the decoder 750B (FIG. 7B) in the second column control unit 710B in the fourth routing module 502H (FIG. 5) in the second routing stage 410 transmits the acknowledgment signal ('1') to the J input port 730B (FIG. 7B) of the JK flip-flop 732B. As described above, the second column control unit 710B (FIG. 7B) controls the second output line 708B of the routing module 502H (FIG. 5). The K-input port 738B (FIG. 7B) of the JK flip-flop 732B is always connected to ground ('0'). A high level logic signal ('1') at the J input port 730B and a low level logic signal ('0') at the K input port 738B cause the JK flip-flop 732B to output a low level logic signal ('0') via the ~Q output port 736B to the first input port 742B of the AND gate 746B.

The AND gate 746B outputs a low level logic signal ('0') to the ENABLE port 748B of the decoder 750B. The low level logic signal ('0') at the ENABLE port 748B disables the decoder 750B from activating any crosspoints 782A–782D on the second output line 708B in the fourth routing module 502H (FIG. 5) in the second routing stage 410 during the remainder of the request-grant cycle 808 (FIG. 8). The decoder 750B (FIG. 7B) is also disabled from activating crosspoints on the output line 712B (FIG. 7A) in the acknowledgment crossbar 716 in the fourth routing module 502H (FIG. 5) in the second routing stage 410 during the remainder of the request-grant cycle 808 (FIG. 8).

After the acknowledgment signal ('1') passes, the J input port 730B (FIG. 7B) receives a low level logic signal ('0') during the next sub-cycle 806 (FIG. 8). But the Q output port 736B (FIG. 7B) will continue to output a low level logic signal ('O') until the JK flip-flop 732B is reset by the third clock signal 805 (FIG. 8) via the reset input port 734B (FIG. 7B). The third clock signal 805 (FIG. 8) causes the JK flip-flop 732B (FIG. 7B) to reset at the end of every request-grant cycle 808 (FIG. 8).

Similarly, the J input port 730D (FIG. 7B) of the JK flip-flop 732D in the second routing module 502B (FIG. 5) of the first routing stage 408 receives the acknowledgment signal ('1'). The K-input port 738D (FIG. 7B) of the JK flip-flop 732D in the second routing module 502B (FIG. 5) of the first routing stage 408 is connected to ground ('O'). A high level logic signal ('1') at the J input port 730D (FIG. 7B) and a low level logic signal ('O') at the K input port 738D cause the JK flip-flop 732D to output a low level logic signal ('O') via the Q output port 736D to the first input port 742D of the AND gate 746D.

The AND gate 746D outputs a low level logic signal ('O') to the ENABLE port 748D of the decoder 750D. The low level logic signal ('O') at the ENABLE port 748D disables the decoder 750D from activating any crosspoints 786A–786D on the output line 708D in the second routing module 502B (FIG. 5) in the first routing stage 408 during the remainder of the request-grant cycle 808 (FIG. 8). The decoder 750D (FIG. 7B) is also disabled from activating crosspoints on the third output line 712C (FIG. 7A) of the acknowledgment crossbar 716 in the second routing module 502B (FIG. 5) in the first routing stage 408 during the remainder of the request-grant cycle 808 (FIG. 8).

After the acknowledgment signal ('1') passes, the J input port 730D (FIG. 7B) receives a low level logic signal ('0') during the next sub-cycle 806 (FIG. 8). But the ~Q output port 736D (FIG. 7B) will continue to output a low level logic signal ('0') until the JK flip-flop 732D is reset by the third clock signal 805 (FIG. 8) via the reset input port 734D (FIG. 7B). The third clock signal 805 (FIG. 8) causes the JK flip-flop 732D (FIG. 7B) to reset at the end of every request-grant cycle 808 (FIG. 8).

Thus, the activated crosspoints in the routing crossbar 702 (FIG. 7B) and the reverse-direction acknowledgment crossbar 716 (FIG. 7A) in each routing module 502 (FIG. 5) may change at the beginning of each sub-cycle 806 (FIG. 8) until an acknowledgment signal locks one or more of the control units 710A–710D (FIG. 7B) in a routing module 502 (FIG. 5) during a request-grant cycle 808 (FIG. 8).

In contrast, the activated crosspoints in the crossbar 602 (FIG. 6) and the reverse-direction acknowledgment crossbar 612 in each randomizer 500 (FIG. 5) change at the beginning of each request-grant cycle 808 (FIG. 8). In another embodiment, the activated crosspoints in the crossbar 602 (FIG. 6) and the reverse-direction acknowledgment crossbar 612 (FIG. 6) in each randomizer 500 (FIG. 5) change at the beginning of each sub-cycle 806 (FIG. 8).

Subsequent Cell Headers

As mentioned above, each of the scheduler port controllers 402A–402P (FIG. 4) transmits a first cell header 330 (FIG. 3A) from one of the four sub-queues (not shown) in each scheduler port controller 402 (FIG. 4) to the randomization stage 406 at the beginning of a first request-grant sub-cycle 806A (FIG. 8). If a scheduler port controller 402 (FIG. 4) does not receive an acknowledgment signal from the randomization stage 406 at the end of a first sub-cycle 806A (FIG. 8), the scheduler port controller 402 (FIG. 4) sends another cell header 330 (FIG. 3A) from a different sub-queue (not shown) in the scheduler port controller 402 (FIG. 4) to the randomization stage 406. The order of visiting each sub-queue can be fixed, random, or round-robin. In the following example, a fixed-order embodiment is used.

In this embodiment, at the beginning of a first sub-cycle 806A (FIG. 8), the first four scheduler port controllers 402A–402D (FIG. 4) send cell headers from their first sub-queues. The second set of four scheduler port controllers 402E–402H send cell headers from their second sub-queues. The third set of four scheduler port controllers 402I–402L send cell headers from their third sub-queues. And the fourth set of four scheduler port controllers 402M–402P send cell headers from their fourth sub-queues. At the beginning of a second sub-cycle 806B (FIG. 8), the first four scheduler port controllers 402A–402D (FIG. 4) may send cell headers from their second sub-queues. The second set of four scheduler port controllers 402E–402H may send cell headers from their third sub-queues. The third set of four scheduler port controllers 402I–402L may send cell headers from their fourth sub-queues. And the fourth set of four scheduler port controllers 402M–402P may send cell headers from their first sub-queues.

Continuing with the example above, the fourth column control unit 710D (FIG. 7B) of the second routing module 502B (FIG. 5) in the first routing stage 408 discarded the '11000101' cell header because the '11000101' cell header had a lower priority than the '11011011' cell header. The scheduler port controller 402 (FIG. 4) that sent the '11011011' cell header receives an acknowledgment signal from the acknowledgment crossbar 612 (FIG. 6) in the third randomizer 500C (FIG. 5) at the end of a first sub-cycle 806A (FIG. 8).

The scheduler port controller 402 (FIG. 4) that sent the '11000101' cell header does not receive an acknowledgment signal from the third randomizer 500C (FIG. 5) at the end of a first sub-cycle 806A (FIG. 8). The scheduler port controller 402 (FIG. 4) that sent the '11000101' cell header sends another cell header 330 (FIG. 3A) from a different sub-queue (not shown) in the scheduler port controller 402 (FIG. 4) to the third randomizer 500C (FIG. 5).

If the scheduler port controller 402 (FIG. 4) that sent the '11000101' cell header does not receive an acknowledgment signal from the third randomizer 500C (FIG. 5) at the end of a second sub-cycle 806B (FIG. 8), the scheduler port controller 402 (FIG. 4) sends another cell header 330 (FIG. 3A) from a different sub-queue (not shown) in the scheduler port controller 402 (FIG. 4) to the third randomizer 500C (FIG. 5). The scheduler port controller 402 (FIG. 4) repeats this process until the scheduler port controller 402 receives an acknowledgment signal from the third randomizer 500C (FIG. 5). If the scheduler port controller 402 (FIG. 4) receives an acknowledgment signal, the scheduler port controller 402 does not send any more cell headers 330 (FIG. 3A) to the randomization stage 406 (FIG. 4) until the next request-grant cycle 808 (FIG. 8).

At the end of each request-grant cycle 808, each scheduler port controller 402 (FIG. 4) that received an acknowledgment signal transmits request grant information (based on the acknowledgment signal) to the port processor 102 (FIG. 1) that originally sent the cell headers to the scheduler port controller 402 (FIG. 4).

Thus, within one request-grant cycle 808 (FIG. 8), each scheduler port controller 402 (FIG. 4) may test up to four cell headers from the sub-queues inside the scheduler port controller 402. In one request-grant cycle 808 (FIG. 8), the 16 scheduler port controllers 402A–402P (FIG. 4) may test up to 64 cell headers from the sub-queues inside the scheduler port controllers 402A–402P. A very high throughput can be achieved.

Each port processor 102 (FIG. 1) that receives request grant information from one of the scheduler port controllers 402A–402P (FIG. 4) transmits the request-granted cell to the switch fabric 104 (FIG. 1). The switch fabric 104 routes the cells to their appropriate destination port processors 102A–102P, which output the cells via the output ports 101A–101P to the line card (not shown). There may be some latency between the arrival time and the scheduled transmission time.

Switch Fabric 104

Figure 9A:
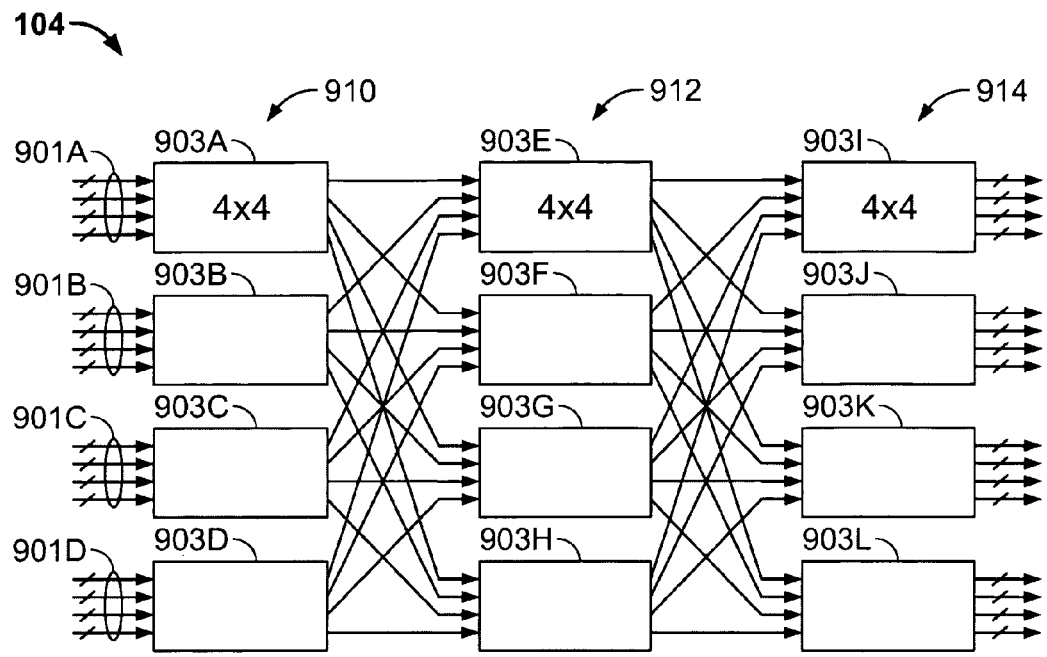
FIG. 9A illustrates one embodiment of a switch fabric in the switch architecture of FIG. 1.

FIG. 9A illustrates one embodiment of a switch fabric 104 in FIG. 1. The switch fabric 104 of FIG. 9A has a first routing stage 910, a second routing stage 912 and a third routing stage 914. The interconnection pattern in FIG. 9A is similar to the interconnection pattern in FIG. 5. In other embodiments, there may be more than four or less than four routing modules in the first routing stage 910 of FIG. 9A. Similarly, there may be more than four or less than four routing modules in the second and/or third routing stages 912, 914 of FIG. 9A. Also, each routing module may have more than four or less than four input and output lines.

In general, the switch fabric 104 in FIG. 9A receives cells from the port processors 102A–102P (FIG. 1) which have been granted access by the scheduler 106. There are no contentions between the cells received by the switch fabric 104 because the scheduler 106 has resolved any contentions. If there are 16 port processors 102A–102P, then the switch fabric 104 receives and switches up to 16 cells to destination port processors 102A–102P during a slot in a time frame.

As described above, each port processor 102 (FIG. 1) takes two bits from the entry of the randomization PROM 210 (FIG. 2) selected by the pointer 216. The two bits are added to the destination port address field 332 (FIG. 3A). The two bits correspond to the output line address of a randomizer 500 (FIG. 5) that performs the function of randomization. Each routing module 903 (FIG. 9A) in the first stage 910 of the switch fabric 104 uses the two bits to route incoming cells. Because the pointers 216 (FIG. 2), 610 (FIG. 6) are synchronized, each routing module 903 (FIG. 9A) in the first stage 910 of the switch fabric 104 uses the same randomization permutation as a corresponding randomizer 500 (FIG. 5). This will prevent any contentions in the routing module 903 (FIG. 9A) in the first stage 910 of the switch fabric 104.

Each routing module 903 (FIG. 9A) in the second stage 912 of the switch fabric 104 routes cells according to the first two bits 331 (FIG. 3A) of the destination addresses 332 in the cell headers 330 of the cells. Each routing module 903 (FIG. 9A) in the third stage 914 routes cells to port processors 102A–102P according to the last two bits 333 (FIG. 3A) of the destination addresses 332 in the cell headers 330 of the cells.

Figure 9B:
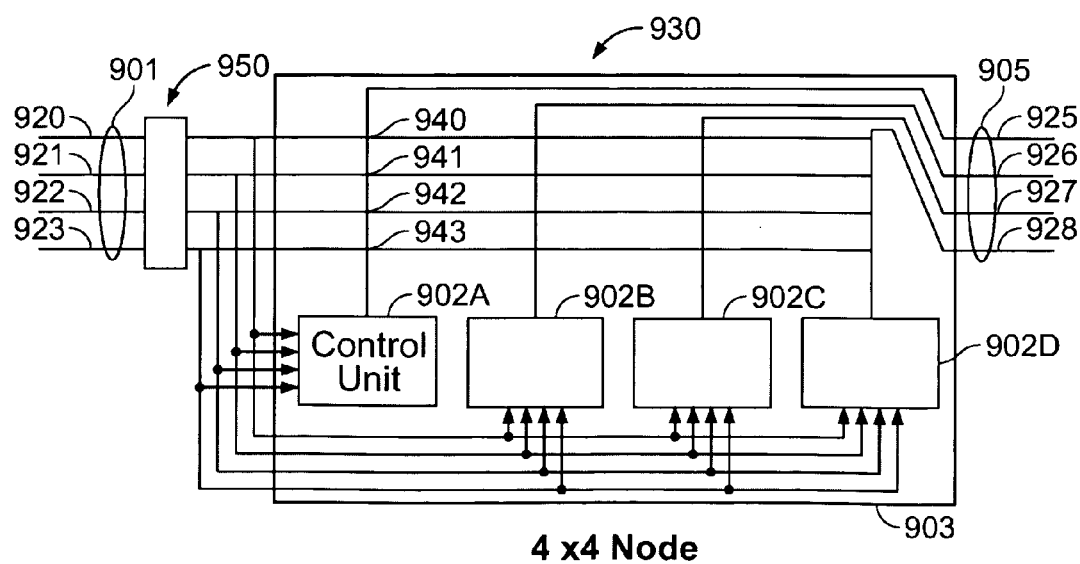
FIG. 9B illustrates one embodiment of a routing module in second and third routing stages of the switch fabric of FIG. 9A.

FIG. 9B illustrates one embodiment of a routing module 903 in the second and third routing stages 910, 912 and 914 of the switch fabric 104 of FIG. 9A. The routing module 903 of FIG. 9B comprises four control units 902A–902D, a register 950 and a crossbar 930 of electronic transistors and/or switches. The incoming cells stay in the register 950 until the crossbar 930 is set up by the control units 902A–902D. Each control unit 902 in FIG. 9B receives cells from the register 950 and controls one of the output lines 925–928. For example, the first control unit 902A (FIG. 9B) controls the crosspoints 940–943 on a first output line 925.

Figure 9C:
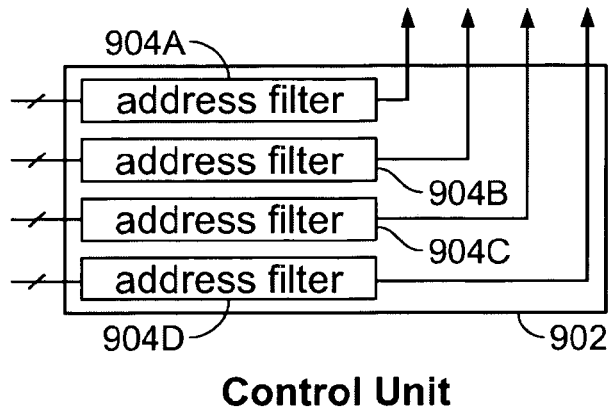
FIG. 9C illustrates one embodiment of a control unit in the routing module of FIG. 9B.

FIG. 9C illustrates one embodiment of a control unit 902 in the routing module 903 of FIG. 9B. The control unit 902 of FIG. 9C comprises four address matching filters 904A–904D. The address matching filters 904A–904D (FIG. 9C) of the first control unit 902A (FIG. 9B) store a '00' value because the first control unit 902A controls the first output line 925. The address matching filters 904A–904D (FIG. 9C) of the second control unit 902B (FIG. 9B) store a '01' value because the second control unit 902B controls the second output line 926. The address matching filters 904A–904D (FIG. 9C) of the third control unit 902C (FIG. 9B) store a '10' value because the third control unit 902C controls the third output line 927. The address matching filters 904A–904D (FIG. 9C) of the fourth control unit 902D (FIG. 9B) store a '11' value because the fourth control unit 902D controls the fourth output line 928.

Each address matching filter 904 (FIG. 9C) receives a cell from one of the input lines 920–923 (FIG. 9B). Each address matching filter 904 (FIG. 9C) in a control unit 902 (FIG. 9B) in a routing module 903 (FIG. 9A) of the second routing stage 912 determines whether the first two bits 331 (FIG. 3A) of the destination address 332 of the cell header 330 match the stored value in the address matching filter 904 (FIG. 9C). If the cell is valid (marked by an asserted VALID bit 336 (FIG. 3A) in the cell header 330) and the first two bits 331 of the destination address 332 of the cell header 330 match the stored value in the address matching filter 904 (FIG. 9C), the address matching filter 904 activates a crosspoint in the crossbar 930 (FIG. 9B) and transmits the cell to an output line coupled to the address matching filter 904.

If the first two bits 331 (FIG. 3A) of the destination address 332 of the cell header 330 do not match the stored value in the address matching filter 904 (FIG. 9C), the address matching filter 904 discards the incoming cell.

Similarly, each address matching filter 904 (FIG. 9C) in a control unit 902 (FIG. 9B) in a routing module 903 (FIG. 9A) of the third routing stage 914 determines whether the last two bits 333 (FIG. 3A) of the destination address 332 of the cell header 330 match the stored value in the address matching filter 904 (FIG. 9C). If the last two bits 333 (FIG. 3A) of the destination address 332 of the cell header 330 match the stored value in the address matching filter 904 (FIG. 9C), the address matching filter 904 activates a crosspoint in the crossbar 930 (FIG. 9B) and transmits the cell to an output line coupled to the address matching filter 904.

If the last two bits 331 (FIG. 3A) of the destination address 332 of the cell header 330 does not match the stored value in the address matching filter 904 (FIG. 9C), the address matching filter 904 discards the incoming cell.

For example, the third address matching filter 904C (FIG. 9C) in the first control unit 902A (FIG. 9B) in the second routing module 903B (FIG. 9A) in the second routing stage 912 of the switch fabric 104 has a stored value of '00' because the first control unit 902A (FIG. 9B) controls the first output line 925. When the third address matching filter 904C (FIG. 9C) in the first control unit 902A (FIG. 9B) in the second routing module 903B (FIG. 9A) in the second routing stage 912 of the switch fabric 104 receives a cell via the third input line 922 (FIG. 9B), the filter 904C (FIG. 9C) examines the first two bits 331 (FIG. 3A) of the destination address 332 of the cell header 330. The address matching filter 904C (FIG. 9C) determines whether the first two bits 331 (FIG. 3A) of the destination address 332 matches the stored value of '00' in the filter 904C (FIG. 9C).

If there is a match, the third address matching filter 904C activates a crosspoint 942 (FIG. 9B) in the crossbar 930 and transmits the cell to the first output line 925, which is coupled to the first control unit 902A. If there is no match, the third address matching filter 904C discards the cell.

Random Selection of Cell Headers in the Scheduler

In other embodiments, each control unit 710 (FIGS. 7A and 7B) in the routing modules 502 (FIG. 5) may use other methods to select a cell header 330 (FIG. 3A) from two or more cell headers 330 with destination addresses 332 that match the stored address bits of the address matching filters (e.g., filters 765A–768A in FIG. 7B), instead of comparing the priority bits 334 (FIG. 3A) of the headers 330 to resolve contentions. For example, the control units 710 (FIG. 7A) in the routing modules 502 (FIG. 5) may randomly select a cell header 330 from two or more cell headers 330 (FIG. 3A) with destination addresses 332 that match the address of the address matching filters (e.g., filters 765A–768A in FIG. 7B).

Multiple-Chip Scheduler

If the scheduler 106 in FIG. 1 is a single-chip scheduler, and the number of ports 101A–101P is increased, traffic sent to the scheduler 106 may eventually create bottlenecks. In addition, if faster link (transmission) speeds are desired, the scheduling time may be reduced, and the scheduling by a single-chip scheduler may eventually become a bottleneck.

Figure 10:
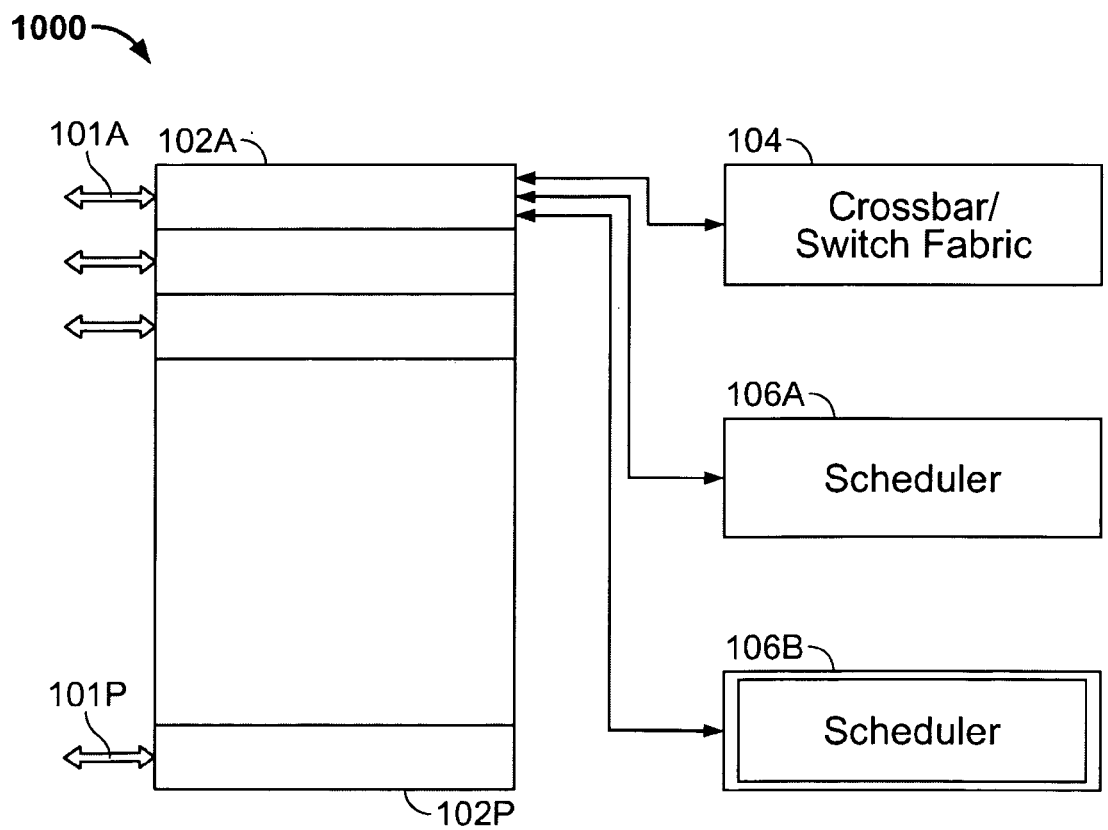
FIG. 10 illustrates one embodiment of a switch architecture that comprises a plurality of port processors, a switch fabric and two schedulers.

FIG. 10 illustrates one embodiment of a switch architecture 1000 that comprises a plurality of port processors 102A–102P, a switch fabric or crossbar 104 and two schedulers 106A, 106B. Other embodiments of the switch architecture 1000 may comprise more than two schedulers 106. The two schedulers 106A, 106B may be implemented on a single microchip or on two microchips (called a multiple-chip or multi-chip scheduler).

Multiple schedulers can minimize the problems associated with a large number of ports 101 (FIG. 10) and faster link speeds, and still provide all of the advantages of a single-chip scheduler, such as in-sequence cell transmissions, fast scheduling and high performance.

Another Embodiment of a Port Processor

Figure 11A:
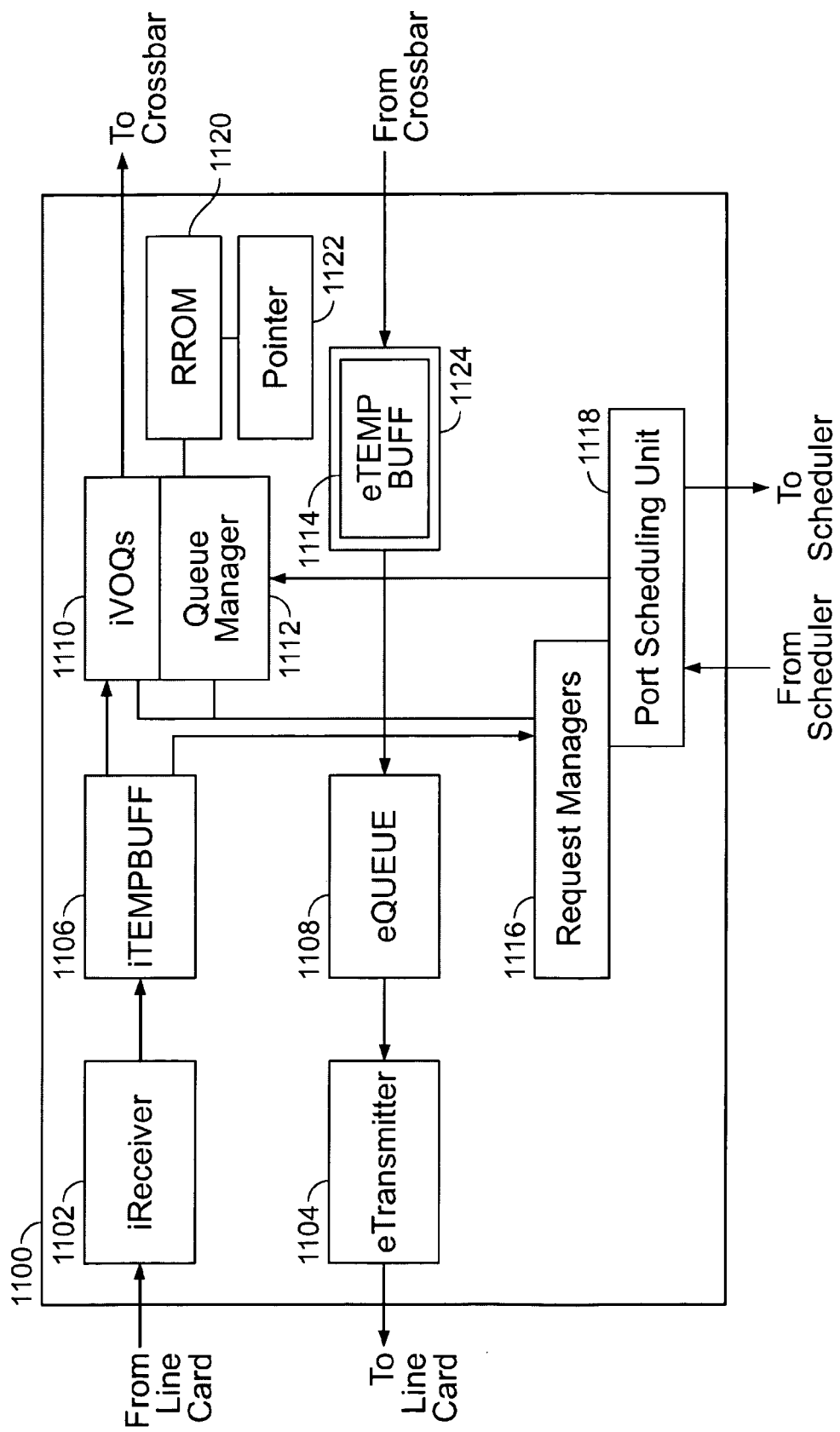
FIG. 11A illustrates another embodiment of a port processor that may be implemented in the switch architecture in FIG. 1 or the switch architecture in FIG. 10.

FIG. 11A illustrates another embodiment of a port processor 1100 that may be implemented in the switch architecture 100 in FIG. 1 or the switch architecture 1000 in FIG. 10. In other words, each of the port processors 102A–102P in FIG. 1 and FIG. 10 may comprise the port processor 1100 shown in FIG. 11A instead of the port processor 102 shown in FIG. 2. The structures and functions of the port processor 1100 in FIG. 11A may be substantially similar to the structures and functions of the port processor 102 in FIG. 2, except for the differences described below.

The port processor 1100 in FIG. 11A comprises an ingress receiver (iReceiver) 1102, an ingress temporary storage buffer (iTEMPBUFF) 1106, a plurality of ingress virtual output queues (iVOQs or VOQs) 1110, a queue manager 1112, an egress transmitter (eTransmitter) 1104, an egress queue (eQUEUE) 1108, an egress temporary buffer (eTEMP BUFF) 1114 in a switch receiver 1124, one or more request managers 1116, a port scheduling unit 1118, a RROM 1120 and a pointer 1122.

In one embodiment, the ingress receiver 1102 in FIG. 11A is a finite state machine. The ingress temporary storage buffer 1106, eQUEUE 1108 and eTEMP BUFF 1114 may each comprise memory space in one or more random access memories (RAMs) or other suitable data storage media or devices. The VOQs 1110 may comprise memory space in a RAM, as described below with reference to FIG. 11C, or other suitable data storage media or device.

The request managers 1116, queue manager 1112 and port scheduling unit 1118 in FIG. 11A may each comprise hardware, software or some combination of hardware and software, such as one or more microcontrollers executing firmware. In one embodiment, some or all of the functions of the request managers 1116, queue manager 1112 and port scheduling unit 1118 described below may be performed by one microcontroller executing firmware. The request managers 1116, queue manager 1112 and port scheduling unit 1118 may further comprise registers to store configurable variables, which are described below.

In general operation, the ingress receiver 1102 in FIG. 11A receives and processes cells from a line card coupled to the port processor 1100. The receiver 1102 may process each incoming cell, such as examining the cell header (e.g., header 330 in FIG. 3A) to determine whether the cell contains control bits or data bits. After processing, the receiver 1102 sends the cells to the ingress temporary storage buffer 1106.

The storage buffer 1106 in FIG. 11A temporarily stores incoming cells from the ingress receiver 1102. The storage buffer 1106 sends incoming data cells to the VOQs 1110 and may send copies of the data cell headers to the request managers 1116. The request managers 1116, the port scheduling unit 1118 and one or more schedulers 106 (FIG. 1 or FIG. 10) process the cell headers for scheduling.

The VOQs 1110 in FIG. 11A store incoming data cells based on each cell's destination port address 332 (FIG. 3A) and priority level 334, if any, as described below. The port processor 1100 in FIG. 11A has at least N virtual output queues 1110, where N is equal to the total number of destination ports 101 of the switch architecture 100 in FIG. 1 or switch architecture 1000 in FIG. 10. For example, if there are 16 destination ports 101A–101P in the switch architecture 1000 in FIG. 10 and one priority level, then there are at least 16 VOQs 1110 (FIG. 11A) in each port processor 1100.

The request managers 1116 in FIG. 11A receive cell headers from the buffer 1106 or the VOQs 1110 and form cell header schedule requests to send to the port scheduling unit 1118, as described further below.

The port scheduling unit 1118 in FIG. 11A receives cell header requests from the request managers 1116 and sends the header requests to the scheduler(s) 106 (FIG. 1 or FIG. 10) for scheduling.

In one embodiment, the port scheduling unit 1118 in FIG. 11A may send a plurality of cell header requests to a scheduler 106 (FIG. 1 or FIG. 10) at a time, where the scheduler 106 has a modified crossbar (not shown) to receive multiple cell header requests. For example, in one configuration, the port scheduling unit 1118 may send two cell header requests to a scheduler 106 at a time, where the scheduler 106 has a modified crossbar to simultaneously receive two cell header requests from each port processor 102. In another configuration, the port scheduling unit 1118 may send four cell header requests to a scheduler 106 at a time, where the scheduler 106 has a modified crossbar to simultaneously receive four cell header requests from each port processor 102.

The port scheduling unit 1118 may perform load-balancing by sending more cell header requests from one or more specific request managers 1116. For example, the port scheduling unit 1118 may send more cell header requests from a request manager 1116 with more packets in the request manager's VOQs 1130 (FIG. 11B) than other request managers 1116, to the scheduler(s) 106 (FIG. 1 or FIG. 10). The port scheduling unit 1118 may also perform load-balancing by sending cell header requests to a specific scheduler 106, such as the scheduler 106A in FIG. 10, with less pending requests than another scheduler 106B.

The scheduler(s) 106 (FIG. 1 or FIG. 10) is configured to schedule cell header transmissions (e.g., resolve contentions, as described above with reference to FIGS. 1–9C) and send request grant information (also called transmission request grants) back to the port scheduling unit 1118 (FIG. 11A). The port scheduling unit 1118 passes the request grant information to the queue manager 1112.

The queue manager 1112 in FIG. 11A receives and uses the request grant information from the port scheduling unit 1118 to coordinate the transmission of cells to the crossbars/switch fabric 104 (FIG. 1 or FIG. 10).

The switch receiver 1124 in FIG. 11A receives and processes switched cells from the switch fabric 104 (FIG. 1 or FIG. 10). The egress temporary buffer (eTEMP BUFF) 1114 is configured to temporarily store egress cells from the switch fabric 104 while the receiver 1124 processes the cells. The egress buffer 1114 may perform some functions that are similar to some functions of the ingress buffer 1106. After processing, the switch receiver 1124 sends the egress cells to the egress queue 1108.

The egress queue 1108 stores the egress cells before the egress transmitter 1104 sends the cells to a line card. If the line card is congested, disrupted or inactive, the egress queue 1108 provides a storage of egress cells until the line card is less congested or restored.

Virtual Output Queues

The port processor 1100 in FIG. 11A may have at least one VOQ in the set of VOQs 1110 that stores cells intended for each destination port 101 of the switch architecture 100 in FIG. 1 or the switch architecture 1000 in FIG. 10. If the switch architecture 100 in FIG. 1 or switch architecture 1000 in FIG. 10 has N number of destination ports 101, then each port processor 1100 may have at least N VOQs 1110 to receive incoming data cells.

In one embodiment, the switch architecture 100 in FIG. 1 or the switch architecture 1000 in FIG. 10 has N destination ports and supports M number of priority levels (also called 'priorities'). In this embodiment, each port processor 1100 in FIG. 11A has M×N VOQs. For example, if N is equal to 16 and M is equal to 8, e.g., three priority bits 334 in the cell header 300 in FIG. 3A support up to eight priority levels, then there are 8×16 =128 VOQs. As another example, if N is equal to 512 and M is equal to 8, then there are 512×8=4,096 VOQs.

Figure 11B:
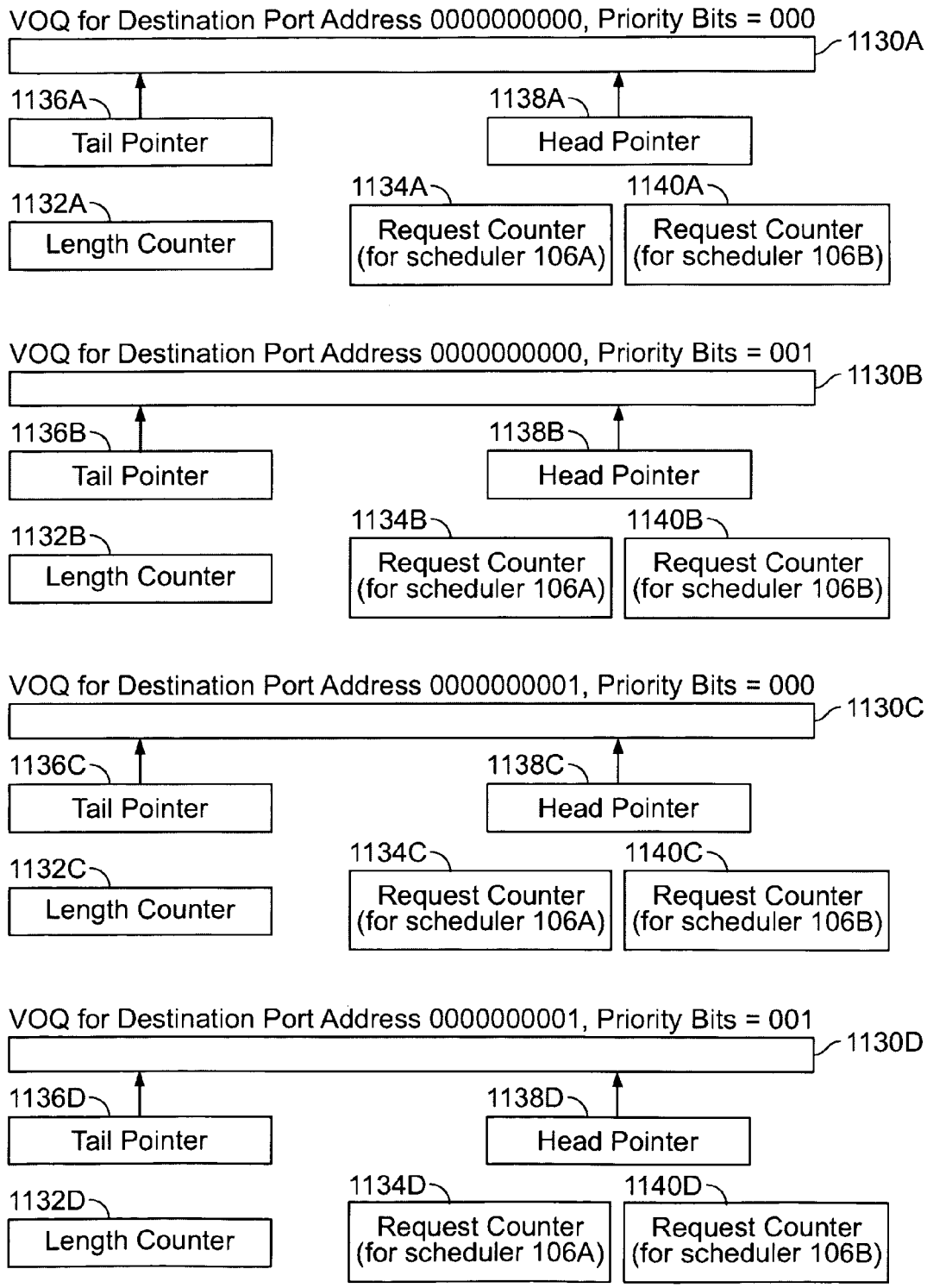
FIG. 11B illustrates one embodiment of a plurality of virtual output queues (VOQs) within the port processor of FIG. 11A.

FIG. 11B illustrates one embodiment of a plurality of VOQs 1130A–1130D within the set of VOQs 1110 in the port processor 1100 of FIG. 11A. Although only four VOQs 1130A–1130D are shown in FIG. 1B, the set of VOQs 1110 in the port processor 1100 of FIG. 11A may comprise any number of VOQs. In FIG. 11B, the VOQ 1130A stores cells with a destination port address of 0 (e.g., destination port address bits=0000000000) and a priority level of 0 (e.g., priority bits=000). The VOQ 1130B stores cells with a destination port address of 0 (e.g., destination port address bits=0000000000) and a priority level of 1 (e.g., priority bits=001). The VOQ 1130C stores cells with a destination port address of 1 (e.g., destination port address bits=0000000001) and a priority level of 0 (e.g., priority bits=000). The VOQ 1130D stores cells with a destination port address of 1 (e.g., destination port address bits=0000000001) and a priority level of 1 (e.g., priority bits=001). The destination port address and the priority level may comprise any configurable number of bits.

In one embodiment, the VOQs 1110 within a port processor 1100 in FIG. 11A are divided into groups, called VOQ Groups (VOQGs), based on the first four most significant bits of the destination port address in a cell header (e.g., header 330 in FIG. 3A). In this embodiment, the destination port address may comprise four bits, as shown in FIG. 3A, or more than four bits. For example, VOQs that store cells with a 10-bit destination port address of "0000xxxxxx" belong to one VOQG, while VOQs that store cells with a 10-bit destination port address of "0001xxxxxx" belong to another VOQG. The "x's" symbolize don't cares.

In other embodiments, the VOQGs are organized by less than four or more than four most significant bits of the destination port address in a cell header. In these embodiments, the destination port address of the cell headers may be less than four bits or more than four bits in length.

In one example, the switch architecture 100 in FIG. 1 has 512 destination ports (N=512)(9-bit destination addresses), eight 3-bit priority levels (M=8), and 512×8=4096 VOQs. In this example, if the VOQGs are organized by the four most significant bits of the destination port address in a cell header 330 (FIG. 3A), there are $2^4$=16 VOQGs, and each VOQG has 4096/16=256 VOQs.

Head Pointer and Tail Pointer

In one embodiment, each VOQ 1130 in FIG. 11B is a circular queue with an associated head pointer 1138 and a tail pointer 1136. The head pointer 1138 and tail pointer 1136 may be implemented as registers/flip-flops or other suitable structure in or near the queue manager 1112 (FIG. 11A). The head pointer 1138 points to or stores the memory address of first data cell stored in the VOQ 1130, which will be the first cell removed from the VOQ 1130, as described below. The tail pointer 1136 points to or stores the memory address of the last data cell stored in the VOQ 1130, which will be the last cell removed from the VOQ 1130, as described below. Thus, each VOQ 1130 may operate as a first-in-first-out (FIFO) device.

Length Counter

In FIG. 11B, each VOQ 1130 has an associated LENGTH counter 1132 and at least one REQUEST counter 1134, which may be implemented as registers/flip-flops or other suitable structure in or near the queue manager 1112. The LENGTH counter 1132 in FIG. 11B indicates a total number of cells stored in a VOQ 1130 for each priority level. For example, if there are eight priority levels and 16 destination ports, then a port processor 1100 has 8×16=128 VOQs 1110 and 128 LENGTH counters.

In one configuration, the value of a LENGTH counter 1132 should not exceed a pre-determined maximum value MaxLen, which is a maximum number of cells that should be stored in each VOQ 1130. The size of each VOQ 1130 may be pre-determined and/or configurable, and its MaxLen value may be configurable. If the value of a LENGTH counter 1132 is equal to or greater than MaxLen, the queue manager 1112 or the request manager 1116 may cause the port processor 1100 (FIG. 11A) to activate one or more port-specific flow control processes.

One port-specific flow control process involves sending a port-specific stop signal from the port processor 1100 in FIG. 11A to the line card coupled to the I/O port 101 (FIG. 1 or FIG. 10) of the port processor 1100. The port-specific stop signal instructs the line card to stop sending cells with a destination port address for the VOQ 1130 (FIG. 11B) with a LENGTH counter 1132 that is equal to or greater than MaxLen. If the LENGTH counter 1132 becomes equal to or less than MaxLen, the port processor 1100 may send a signal to the line card to instruct the line card to resume sending cells with a destination port address for the VOQ 1130 associated with the LENGTH counter 1132.

Another port-specific flow control process comprises sending a signal from the port processor 1100 in FIG. 11A to the line card to instruct the line card to slow down the transmission of cells with a destination port address for the VOQ with a LENGTH counter 1132 that is equal to or greater than MaxLen.

Request Counter

A REQUEST counter 1134 in FIG. 11B counts the number of transmission schedule requests that have been sent to a scheduler(s) 106 (FIG. 1 or FIG. 10) and are still pending.

For example, if the LENGTH Counter 1132A 7 (FIG. 11B) and the REQUEST Counter 1134A 3 for VOQ 1130A (for priority level=000), there are seven cells destined for egress (destination) port 0 with a priority level=000 and three requests sent to the scheduler(s) 106. When a grant comes back from a scheduler 106 (FIG. 1 or FIG. 10) for a first cell in VOQ 1130A (designated by the head pointer 1138A), the queue manager 1112 removes the first cell from VOQ 1130A and sends the cell to the crossbar 104 (FIG. 1 or FIG. 10). The queue manager 1112 (FIG. 11A) decrements both the LENGTH counter 1132A and the REQUEST counter 1134A by one.

In one configuration, the value of the REQUEST counter 1134 should not exceed a pre-determined maximum value MaxReq, which is the maximum number of requests allowed to enter the scheduler(s) 106 during a period of time. MaxLen may be a configurable value. If the REQUEST counter 1134 exceeds MaxReq, the request manager 1116 (FIG. 11A) associated with that particular VOQ 1130 may stop sending cell header transmission requests to the scheduler 106 (FIG. 1) or send the cell header transmission requests to another scheduler, such as the scheduler 106B in FIG. 10.

If there are two or more schedulers, such as the two schedulers 106A, 106B in FIG. 10, then there may be two or more REQUEST counters for each VOQ 1130, such as the REQUEST counters 1134A and 1140A for VOQ 1130A in FIG. 11B.

Reset

If one or more schedulers 106 (FIG. 1 or FIG. 10) encounter an error or disruption (e.g., where one or more cell header requests in the scheduler(s) 106 are lost), the port processor 1100 (FIG. 11A) may "reset" and resend one or more cell header requests to the scheduler(s) 106. Specifically, the request managers 1116 and/or the queue manager 1112 can read the head pointers 1138 (FIG. 11B) to determine which data cells have not yet received a request grant from the scheduler(s) 106 before the disruption. The request managers 1116 and the port scheduling unit 1118 can then resend one or more cell header requests to the scheduler(s) 106 when the scheduler(s) 106 is ready to receive cell header requests. The queue manager 1112 can reset the REQUEST counter(s) 1140 to zero.

VOs and Linked Lists

Figure 11C:
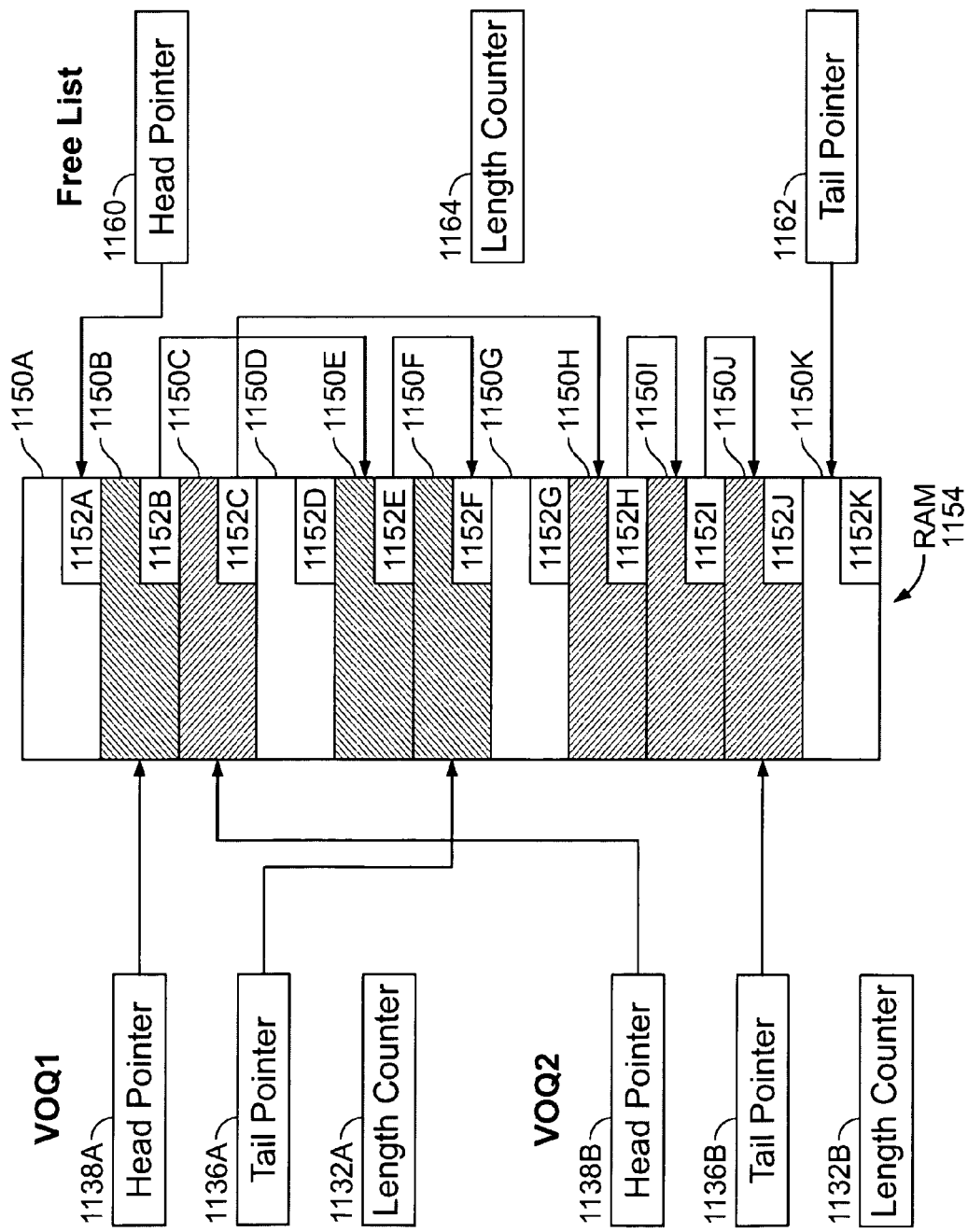
FIG. 11C illustrates one implementation of two VOQs and their associated pointers and counters in FIG. 11B.

FIG. 11C illustrates one implementation of two VOQs and some of their associated pointers 1138A, 1136A, 1138B, 1136B and counters 1132A, 1132B described herein with reference to FIG. 11B. Although two VOQs and their pointers and counters are shown in FIG. 11C as an example, the port processor 1100 in FIG. 11A may have any number of VOQs, pointers and counters. The data cells of VOQ1 in FIG. 11C are stored in a plurality of memory cells 1150B, 1150E, 1150F of the RAM 1154. The data cells of VOQ2 in FIG. 11C are also stored in a plurality of memory cells 1150C, 1150H–1150J of the RAM 1154. Thus, two or more VOQs may share the same RAM 1154.

Although 11 memory cells 1150A–1150K are shown in FIG. 11C, the RAM 1154 may have any number of memory cells, such as 1000 memory cells or more. The RAM 1154 may be a dynamic RAM (DRAM), a static RAM (SRAM) or a combination of RAM and SRAM. The counters 1132A, 1132B, 1164 and pointers 1136A, 1136B, 1138A, 1138B, 1160, 1162 in FIG. 11C may be implemented as a plurality of registers.

As shown in FIG. 11C, the data cells for each VOQ may be stored in a 'linked' list of staggered or non-sequential memory cells 1150A–1150K. Each memory cell 1150 is configured to store data bits and control bits 1152 (also called a pointer) that point or link to the next memory cell 1150 in a linked list. Examples of linked lists are VOQ1, VOQ2 and a list of free memory cells. For example, the second memory cell 1150B has control bits 1152B that link to the next memory cell 1150E (the fifth memory cell), which stores the next data cell in VOQ1. Similarly, the fifth memory cell 1150E has control bits 1152E that link to the next memory cell 1150F (the sixth memory cell), which stores the next data cell in VOQ1.

In this example, the head pointer 1138A for VOQ1 points to the memory cell that stores the first data cell of VOQ1, which is the second memory cell 1150B of the RAM 1154. The tail pointer 1136A of VOQ1 points to the memory cell that stores the last data cell of VOQ1, which is the sixth memory cell 1150F of the RAM 1154. The control bits of the last VOQ1 memory cell 1150F may store a particular pattern such as 'FFFF' (hexadecimal) or '1111.' The LENGTH counter 1132A for VOQ1 in FIG. 11C is equal to three.

The LENGTH counters 1132A, 1132B, the MaxLen values and port-specific flow control described above may prevent a VOQ from using a large portion of the available memory cells 1150A–1150K in the RAM 1154, which is shared among a plurality of VOQs.

Link flow control is another form of flow control. If the total number of memory cells 1150 in the RAM 1154 currently storing VOQ data cells is equal to or greater than a configurable, pre-determined variable, then the port processor (102 in FIG. 1 or 1100 in FIG. 11A) sends a signal to the line card to instruct the line card to stop or slow down the transmission of cells to the port processor.

FIG. 11C also illustrates a head pointer 1160, a tail pointer 1162 and a LENGTH counter 1164 that designate a linked list of available (free) memory cells 1150A, 1150D, 1150G, 1150K. When a data cell associated with either VOQ1 or VOQ2 is removed from the RAM 1154, the queue manager 1112 in FIG. 1A adjusts the pointers 1160, 1162 and the LENGTH counter 1164 accordingly. Thus, the queue manager 1112 in FIG. 11A may keep track of available (free) memory cells in the RAM 1154.

For example, if a new data cell is added to VOQ1, the queue manager 1112 (FIG. 11A) examines the "free list" head pointer 1160 (FIG. 11C) to determine the next available (free) memory cell, which is memory cell 1150A, and stores the new data cell in memory cell 1150A. The queue manager 1112 adjusts the free list head pointer 1160 to point to the next available memory cell 1150D and decrements the free list length counter 1164 by one. The queue manager 1112 also adjusts the control bits 1152F in memory cell 1150F to link to the memory cell 1150A. The queue manager 1112 also adjusts the VOQ1 tail pointer 1136A to point to the memory cell 1150A and increments the VOQ1 LENGTH counter 1132A by one.

As another example, if the queue manager 1112 (FIG. 11A) sends the first data cell of VOQ1 stored in memory cell 1150B to the switch fabric 104 (FIG. 1 or FIG. 10), the queue manager 1112 adjusts the VOQ1 head pointer 1138A to point to the memory cell 1150E and decrements the VOQ1 LENGTH counter 1132A by one. The queue manager 1112 also adjusts the control bits 1152K of the last free memory cell 1150K to link to the memory cell 1150B. The queue manager 1112 also adjusts the free list tail pointer 1162 to point to the memory cell 1150B and increments the free list length counter 1164 by one.

In one embodiment, one or more 'active' VOQs are implemented in a RAM (see FIG. 11C), and the pointers and counters described above are implemented in a plurality of flip-flops/registers. The queue manager 1112 (FIG. 11A) uses the pointers, the counters and a content-addressable memory (CAM) to store and find data cells of active VOQs in the RAM. This embodiment takes advantage of the fact that it is unlikely for a port processor 1100 to have over 1000 VOQs that are active at one time. For example, a port processor 102 may have only 20–30 active VOQs at one time. Thus, the RAM does not have to reserve memory space for more than 20–30 active VOQs at one time. The queue manager 1112 dynamically configures new VOQs, reads and removes cells from active VOQs and eliminates unused/inactive VOQs.

Request Managers

In one embodiment, there is one request manager 1116 (FIG. 11A) for each VOQG. For example, if there are 512 destination ports in a modified version of the switch architecture 100 in FIG. 1 or the switch architecture 1000 in FIG. 10 and one priority level, then each port processor 1100 (FIG. 11A) has 512 VOQs, 16 VOQGs (using the four most significant bits of the destination address of the cells), 512/16=32 VOQs in each VOQG, and 16 request managers 1116, where each request manager 1116 controls 32 VOQs.

As another example, if there are 512 destination ports in a modified version of the switch architecture 100 in FIG. 1 or the switch architecture 1000 in FIGS. 10 and 8 priority levels, then each port processor 1100 (FIG. 11A) has 512× 8=4,096 VOQs, 16 VOQGs (using the four most significant bits of the destination address of the cells), 4096/16=256 VOQs in each VOQG, and 16 request managers 1116, where each request manager 1116 controls 256 VOQs. In another embodiment, there is one request manager 1116 for a plurality of VOQGs.

A request manager 1116 in FIG. 1A that is associated with a VOQG may convert cell headers (see FIG. 3A) of data packets stored in the VOQs 1130 (FIG. 11B) of the VOQG into a request mini-cell (also called a transmission request) to send to the port scheduling unit 1118. In one embodiment, the request mini-cell comprises two bytes (16-bit) of data: a validity bit, three priority bits, a 10-bit destination port address and two unused bits.

Each request manager 1116 (FIG. 11A) may use a round-robin method to pick VOQs of the VOQG associated with the request manager 1116 to form request mini-cells based on the cell headers. Specifically, each request manager 1116 may start with the first VOQ 1130, e.g., VOQ 1130A in FIG. 11B, of the VOQG associated with the request manager 1116 and determine whether the REQUEST counter 1134A of the first VOQ 1130A is equal to the LENGTH counter 1132A of the first VOQ 1130A. If the REQUEST counter 1134A is less than the LENGTH counter 1132A, the request manager 1116 may take a cell header from the first VOQ 1130A to form a request mini-cell to send to the port scheduling unit 1118.

The request manager 1116 may then move to another VOQ 1130, e.g., VOQ 1130C in FIG. 11B, and determine whether the REQUEST counter 1134C of the next VOQ 1130C is equal to the LENGTH counter 1132C of the next VOQ 1130C. If a REQUEST counter 1134C of the second VOQ 1130C is equal to a LENGTH counter 1132C of the second VOQ 1130C, the request manager 1116 moves on to a third VOQ 1130 in the VOQG associated with the request manager 1116. The request manager 1116 then determines whether the REQUEST counter 1134 of the third VOQ 1130 is equal to the LENGTH counter 1132 of the third VOQ.

Thus, each request manager 1116 may cycle through the LENGTH and REQUEST counters 1132, 1134 of the VOQs 1130 in the VOQG associated with the request manager 1116 in a round robin fashion to select a VOQ 1130 for subsequent schedule requests. A round robin method can achieve 'fair queuing' among all VOQs 1130 in a VOQG.

The examples above assume that the data cells have one priority level. If the data cells have multiple priority levels, a request manager 1116 (FIG. 11A) controls VOQs in a VOQG with a plurality of destination addresses and priority levels. The request manager 1116 may use one or more methods to select VOQs to compare the LENGTH and REQUEST counters 1132, 1134 and send cell header requests based on data packets stored in the selected VOQs to the port scheduling unit 1118. Some examples of methods are described below, but the request manager 1116 is not limited to any particular method of selecting VOQs and sending cell header requests based on data packets stored in the VOQs to the port scheduling unit 1118.

In one example, a request manager 1116 (FIG. 11A) sends a cell header request based on a first data cell in the first VOQ 1130A (FIG. 1B) with a destination port address of 0000000000 and the highest level of priority (e.g., 000) if the REQUEST counter 1134A of the VOQ 1130A is less than the LENGTH counter 1132A. The request manager 1116 may then send a cell header request based on a first data cell stored in another VOQ 1130C (FIG. 11B) with a different destination port address of 0000000001 and the highest level of priority (000) if the REQUEST counter 1134C of the VOQ 1130C is less than the LENGTH counter 1132C.

After the request manager 1116 round-robins once through all of the VOQs 1130 with different destination port addresses and the highest level of priority (000), the request manager 1116 may send a cell header request based on a first data cell stored in a VOQ 1130B (FIG. 11B) with a destination port address of 0000000000 and the next-highest level of priority (e.g., 001) if the REQUEST counter 1134B of the VOQ 1130B is less than the LENGTH counter 1132B.

After the request manager 1116 round-robins once through the VOQs of each priority level, the request manager 1116 returns to the first VOQ 1130A and sends a cell header request based on the next data cell stored in the VOQ 1130A if the REQUEST counter 1134A of the VOQ 1130A is less than the LENGTH counter 1132A.

As another example, the request manager 1116 sends a cell header request based on a first data cell stored in a first VOQ 1130A (FIG. 11B) with a destination port address of 0000000000 and the highest level of priority (e.g., 000) if the REQUEST counter 1134A of the VOQ 1130A is less than the LENGTH counter 1132A. The request manager 1116 may then send a cell header request based on a first data cell stored in another VOQ 1130B with the same destination port address of 0000000000 and the next-highest level of priority (001) if the REQUEST counter 1134B of the VOQ 1130B is less than the LENGTH counter 1132B. The request manager 1116 may round-robin through any other VOQs 1130 with the same destination address but lower priority levels. The request manager 1116 may then send cell header requests based on data cells stored in other VOQs 1130 (e.g., VOQ 1130C in FIG. 11B) with other destination port addresses according to their priority levels from highest to lowest.

As another example, the request manager 1116 may send a cell header request based on a first data cell stored in a randomly-selected VOQ 1130 (e.g., VOQ 1130C) with the highest priority level (e.g., 000) to the port scheduling unit 1118 if the REQUEST counter 1134 of the VOQ 1130 is less than the LENGTH counter 1132. The request manager 1116 may then send cell header requests based on first data cells stored in other randomly-selected VOQs 1130 with various destination port addresses and the highest priority level (000) to the port scheduling unit 1118 if the REQUEST counter 1134 of each VOQ 1130 is less than the LENGTH counter 1132.

After the request manager 1116 has randomly selected all VOQs with the highest priority level, the request manager 1116 may send cell header requests based on first data cells stored in randomly-selected VOQs with the next-highest priority level (001) to the port scheduling unit 1118 if the REQUEST counter 1134 of each VOQ 1130 is less than the LENGTH counter 1132. Thus, the request manager 1116 sends first cell headers based on data cells stored in randomly-selected VOQs 1130 with the same priority level before moving to VOQs 1130 with a different priority level.

As another example, the request manager 1116 may send a cell header request based on a data cell stored in a first VOQ 1130A (FIG. 11B) with a destination port address of 0000000000 and the highest level of priority (e.g., 000) if the REQUEST counter 1134A of the VOQ 1130A is less than the LENGTH counter 1132A. The request manager 1116 may then send a cell header request based on a data cell stored in another VOQ 1130C with a destination port address of 0000000001 and the highest level of priority (000) if the REQUEST counter 1134C of the VOQ 1130C is less than the LENGTH counter 1132C. The request manager 1116 then round-robins through all of the VOQs 1130 with the highest level of priority (000) until there are no cells remaining in the VOQs 1130 with the highest level of priority.

If there are no cells remaining in the VOQs 1130 with the highest level of priority, then the request manager 1116 sends a cell header request based on a data cell stored in a VOQ 1130B with a destination port address of 0000000000 and the next-highest level of priority (001). In this example, there is a possibility that the request manager 1116 will not be able to send cell header requests from VOQs with lower priority levels (e.g., VOQs 1130B, 1130D in FIG. 11B) if VOQs with high priority levels (e.g., VOQs 1130A, 1130C in FIG. 11B) constantly have remaining cells for scheduling.

As another example, the request manager 1116 may use a 'weighted round-robin' scheduling method, instead of a pure 'priority-based scheduling' method. With a weighted round-robin' scheduling method, the request manager 1116 devotes a specific amount of scheduling request bandwidth to VOQs of each priority level. For example, if there are four priority levels (e.g., two priority bits), then ⁴⁄₈ of the scheduling request bandwidth may be devoted to VOQs with the highest priority level (e.g., priority bits=00), ²⁄₈ devoted to VOQs with the second-highest priority level (e.g., priority bits=01), ⅛ devoted to VOQs with the third-highest priority level (e.g., priority bits=10), and ⅛ devoted to VOQs with the fourth-highest priority level (e.g., priority bits=11). In this example, the request manager 1116 will be able to send cell header requests from VOQs with lower priority levels.

The port scheduling unit 1118 in FIG. 11A coordinates requests from the request managers 1116. The port scheduling unit 1118 may also use a round robin process to determine the sending sequence of cell header requests from the request managers 1116 to the scheduler(s) 106. The round robin processes described herein can achieve "fair queuing" among all VOQs 1110.

Time Frame to Transmit Cells to the Switch Fabric

Figure 12:
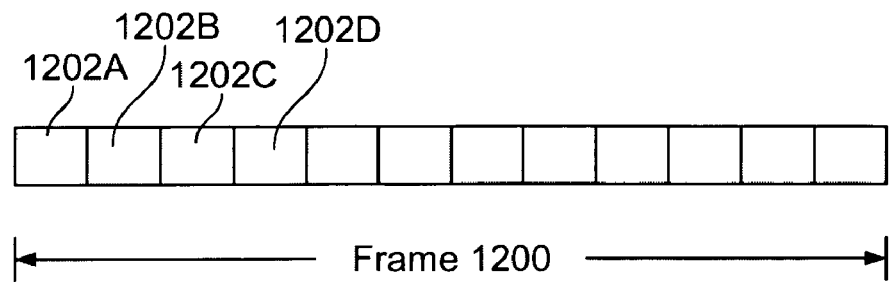
FIG. 12 illustrates one embodiment of a time frame of time slots, where multiple cells may be transmitted to the switch fabric in FIG. 1 or FIG. 10 in a single slot.

FIG. 12 illustrates one embodiment of a time frame 1200 of time slots 1202A–1202C. The queue manager 1112 in FIG. 11A receives request grants from the port scheduling unit 1118 and organizes cell transmissions into frames 1200 with time slots 1202A–1202C, where multiple cells may be transmitted to the switch fabric 104 in FIG. 1 or FIG. 10 in a single slot 1202. In one configuration, the size of a frame 1200 in FIG. 12 is constant. The port processors 102A–102P (FIG. 1 or FIG. 10) and the switch fabric 104 should be in sync at the beginning of a frame 1200 (FIG. 12). All cells granted access in one request grant cycle 808 (FIG. 8) should be sent to the switch fabric 104 in the same time slot 1202 of the frame 1200. Otherwise, the request grants may be useless.

Multiple Schedulers and Port Processors with VOs

The port processor 1100 of FIG. 11A may be implemented in a switch architecture 1000 of FIG. 10, where multiple scheduler chips 106A, 106B share the burden of scheduling. Multiple schedulers 106A, 106B can ease the timing requirement for scheduling and bandwidth.

Each scheduler 106A, 106B in FIG. 10 is configured to schedule cells sent by the port processor 1100 (FIG. 11A) and send request grant signals back to the port processor 1100. No collision will occur as long as cells with request grants from the scheduler 106A are not transmitted to the switch fabric 104 during the same time period, e.g., a slot 1202 in FIG. 12, as cells with request grants from the scheduler 106B. For example, cells with request grants from the scheduler 106A (FIG. 10) may be transmitted in even time slots 1202B, 1202D (FIG. 12) in the frame 1200, while cells with request grants from the scheduler 106B may be transmitted in odd time slots 1202A, 1202C in the frame 1200. No collision will occur.

Furthermore, the port processor 1100 (FIG. 11A) will not send cells out-of-sequence to the switch fabric 104 (FIG. 10) because the requests sent to both schedulers 106A, 106B only comprise headers and not the data packets stored in the VOQs 1110. The order of header requests sent by the port scheduling unit 1118 to the schedulers 106A, 106B does not have to match the order of request grants sent back from the schedulers 106A, 106B to the port scheduling unit 1118 because the header requests sent to both schedulers 106A, 106B comprise destination port addresses, not the data of the cells. Thus, the order of headers sent by the port scheduling unit 1118 to the schedulers 106A, 106B does not affect the transmission order of cells sent to the switch fabric 104.

For example, the port scheduling unit 1118 (FIG. 11A) sends a header request with destination port address 3 to the scheduler 106A (FIG. 10) and then sends another header request with destination port address 5 to the other scheduler 106B. If the request for destination port address 5 is granted first by the scheduler 106B, the port scheduling unit 1118 and queue manager 1112 will simply send the first cell stored in VOQ5 as indicated by a head pointer 1138 in FIG. 11B to the switch fabric 104. In this example, the port processor 1100 will not send any other cell stored in VOQ5, except the first cell, to the switch fabric 104. Thus, there is no out-of-sequence transmission problem.

As another example, the port scheduling unit 1118 (FIG. 11A) sends a header request with destination port address 3 to the scheduler 106A (FIG. 10) and sends another header request with destination port address 3 to the scheduler 106B. If the scheduler 106B grants a request before the scheduler 106A grants a request, the port scheduling unit 1118 and the queue manager 1112 simply send the first cell from VOQ3 as indicated by a head pointer 1138 in FIG. 111B to the switch fabric 104 (FIG. 10). Thus, there is no out-of-sequence transmission problem.

When the schedulers 106A, 106B (FIG. 10) send request grants back to the port processor 1100 (FIG. 11A), the port scheduling unit 1118 may merge the even and odd time slot grants into one stream and send the stream to the queue manager 1112 to schedule time slots 1202 (FIG. 12) for cells to be transmitted to the switch fabric 104. Thus, in this embodiment, the port processor 1100 performs load balancing automatically.

The switch architecture 1000 in FIG. 10 with two schedulers 106A, 106B may perform scheduling twice as fast as the switch architecture 100 in FIG. 1. Furthermore, the amount of traffic to each scheduler 106A, 106B (FIG. 10) may be about half of the amount of traffic to a single-chip scheduler 106 in FIG. 1. This reduction in bandwidth alleviates the bandwidth bottleneck problem in a switch architecture 100 (FIG. 1) with a single-chip scheduler 106.

If the REQUEST counter 1134 (FIG. 11B) of the scheduler 106A (FIG. 10) has a higher value than the REQUEST counter 1140 of the scheduler 106B, then the scheduler 106A may be more congested than the scheduler 106B. The request manager 1116 (FIG. 11A) and/or the port scheduling unit 1118 may automatically send subsequent cell header requests from one or more VOQs 1130 to the scheduler 106B. Likewise, if the scheduler 106B is more congested than the scheduler 106A, the request manager 1116 or the port scheduling unit 1118 may automatically send subsequent cell header requests from one or more VOQs 1130 to the scheduler 106A. Thus, this embodiment of the port processor 1100 performs load balancing automatically.

In one configuration, the request managers 1116 (FIG. 11A) and/or the port scheduling unit 1118 may perform load balancing on a VOQ level for every VOQ 1130 (FIG. 11B) in the set of VOQs 1110 (FIG. 11A). In another configuration, the request managers 1116 (FIG. 11A) and/or the port scheduling unit 1118 may perform load balancing on a VOQG level for every VOQG in the port processor 1100 (FIG. 11A). In other configurations, the request managers 1116 (FIG. 11A) and/or the port scheduling unit 1118 may perform load balancing on other levels.

In one embodiment, each scheduler 106A, 106B in FIG. 10 comprises the structures described above with reference to FIGS. 4–7C. But each randomizer 500 (FIG. 5) in the scheduler 106A may read the even entries of a RROM 608 (FIG. 6), while each randomizer 500 in the scheduler 106B may read the odd entries of a RROM 608.

The description herein of the switch architecture 1000 in FIG. 10 may be extended to a switch architecture with more than two schedulers.

Optional Header Queues

One embodiment of the port processor 1100 described above with reference to FIGS. 11A-12 does not have header queue segments 1300, 1320, 1340, which are described below with reference to FIG. 13. In another embodiment, the port processor 1100 of FIG. 11A has header queue segments 1300, 1320, 1340 instead of or in addition to the VOQs 1110, pointers 1136, 1138 (FIG. 11B) and counters 1132, 1134 described above.

Figure 13:
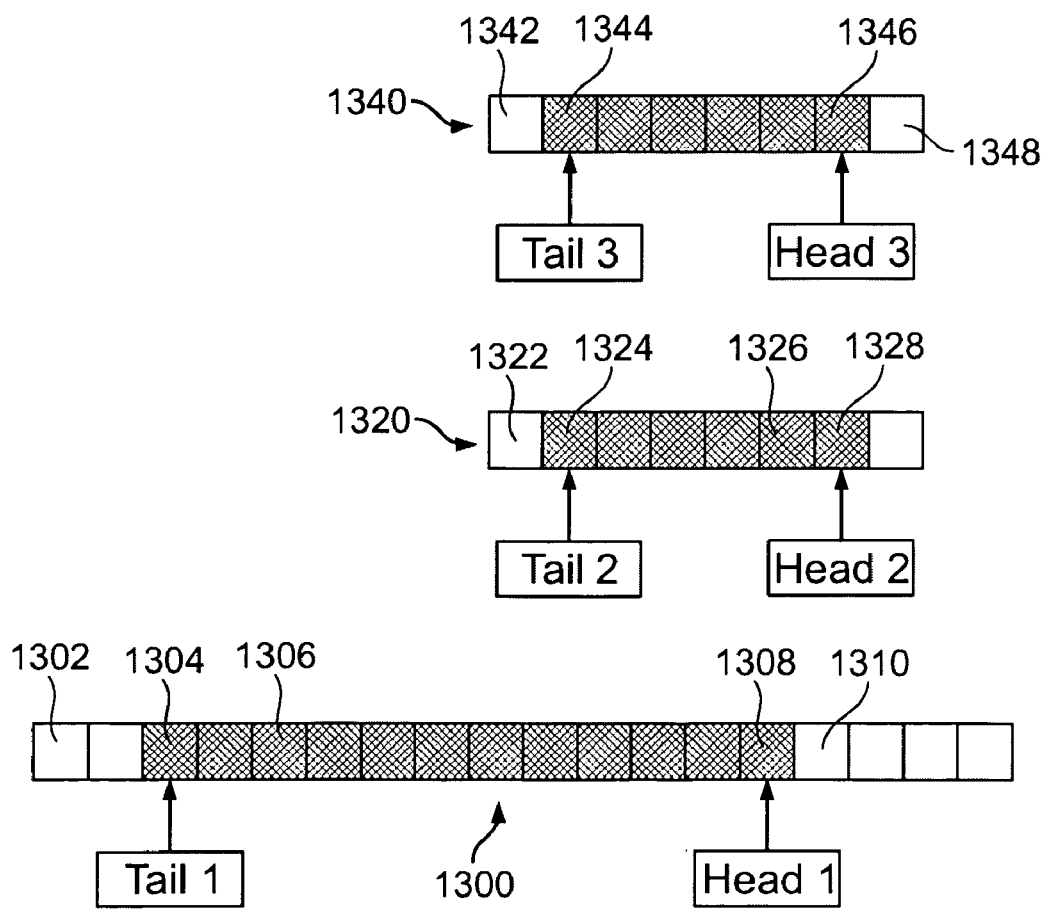
FIG. 13 illustrates one embodiment of three segments of a header queue that are implemented in one embodiment of the port processor in FIG. 11A.

FIG. 13 illustrates one embodiment of three segments 1300, 1320, 1340 of a header queue that are implemented in one embodiment of the request managers 1116 or the port scheduling unit 1118 of the port processor 1100 in FIG. 11A. The three segments 1300, 1320, 1340 may be implemented with RAM. The segment 1300 in FIG. 13 stores headers 300 (FIG. 3A) of incoming cells, which are shown as shaded areas in FIG. 13. Another segment 1320 in FIG. 13 stores headers (requests) that have been sent to the scheduler 106A (FIG. 10) for scheduling, which are shown as shaded areas in FIG. 13. Another segment 1340 in FIG. 13 stores headers (requests) that have been sent to the other scheduler 106B (FIG. 10) for scheduling, which are shown as shaded areas in FIG. 13.

When the segment 1320 (FIG. 13) has an empty slot, the port processor 1100 (FIG. 11A) can send another header request to the scheduler 106A (FIG. 10) and move a header from the segment 1300 (FIG. 13) to the segment 1320. Likewise, when the segment 1340 (FIG. 13) has an empty slot, the port processor 1100 (FIG. 11A) can send another request to the scheduler 106B (FIG. 10) and move a header from the segment 1300 (FIG. 13) to the segment 1340.

If the scheduler 106A (FIG. 10) is more congested than the scheduler 106B, the segment 1320 (FIG. 13) corresponding to the scheduler 106A will have less free space than the segment 1340 corresponding to the other scheduler 106B. The port processor 102 (FIG. 2) or port processor 1100 (FIG. 11A) may automatically send more cell header requests to the scheduler 106B and use the other segment 1340 to store new header requests. Likewise, if the scheduler 106B (FIG. 10) is more congested than the scheduler 106A, the segment 1340 (FIG. 12) corresponding to the scheduler 106B will have less free space than the segment 1320 corresponding to the scheduler 106A. The port processor 102 (FIG. 2) or port processor 1100 (FIG. 11A) may automatically send more cell header requests to the scheduler 106A and use the other segment 1320 to store new header requests. Thus, this embodiment of the port processor 102 (FIG. 2) or port processor 1100 (FIG. 11A) performs load balancing automatically.

If one or more schedulers 106 (FIG. 1 or FIG. 10) encounter an error or disruption (e.g., where one or more cell header requests are lost), the port processor 102 (FIG. 2) or the port processor 1100 (FIG. 11A) may "reset" and resend one or more cell header requests to the scheduler(s) 106. Specifically, the port processor 102 (FIG. 2) or port processor 1100 (FIG. 11A) can read its header queue segments 1320, 1340 (FIG. 13) to determine which cell header requests were sent to the scheduler(s) 106 before the disruption. The port processor 102 (FIG. 2) or port processor 1100 (FIG. 11A) can then resend one or more cell header requests from the header queue segments 1320, 1340 to the scheduler(s) 106 when the scheduler(s) 106 is ready to receive cell header requests.

Implementing the VOQs

As described above with reference to FIG. 11B, the VOQs 1110 in FIG. 11A may be implemented with separate physical queues for each possible combination of destination addresses and priority levels. But separate physical queues may be inefficient if there is a large number of possible destinations and priorities, such as more than 1024.

If the VOQs 1110 are implemented as link lists, all the VOQs 1110 would share a single cell buffer, such as the RAM buffer 1154 in FIG. 11C. Thus, a single buffer implementation reduces the number of memories used by the VOQs 1110 in each port processor 1100 (FIG. 11A).

But if the VOQs 1110 are implemented as link lists, there may be an over-burdening logic problem. Each link list may require a head pointer 1138 (FIG. 11C), a tail pointer 1136, a length counter 1132 and a request counter, such as the request counters 1134, 1140 in FIG. 11B. These pointers and counters may require at least 30 bits of storage per VOQ. For 14,336 VOQs, these pointers and counters may require approximately 4.3M gates or 43 mm$^2$ of Silicon area in a 0.13 µm process. This large amount of logic may also impact arbitration between VOQs when all 2048 VOQs for each priority level are examined in parallel to determine which VOQ should send a request to the scheduler 106 (FIG. 1).

Figures 14, 15:
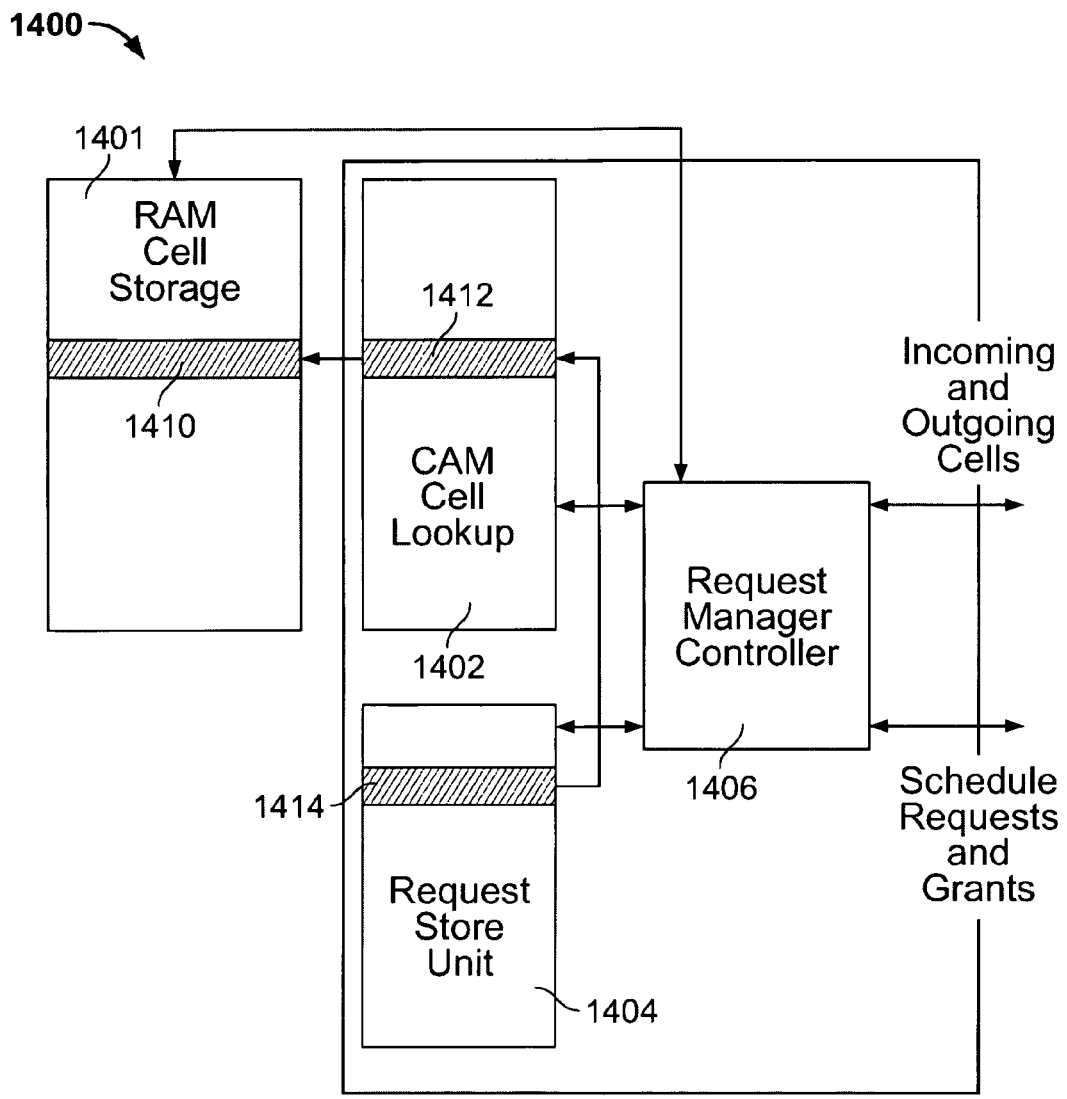
FIG. 14 illustrates one embodiment of a structure that may be implemented in the port processor of FIG. 11A to operate configurable VOQs.
FIG. 15 illustrates an exemplifying format of each entry in the CAM of FIG. 14.

FIG. 14 illustrates one embodiment of a structure 1400 that may be implemented in the port processor 1100 of FIG. 11A to operate configurable VOQs. The structure 1400 in FIG. 14 comprises a RAM 1401, a content addressable memory (CAM) 1402, a request manager controller 1406 and a request store unit 1404. The structure 1400 in FIG. 14 takes advantage of the fact that not all VOQs are active or need to exist at one time. Thus, the structure 1400 advantageously uses configurable VOQs and may not dedicate memory space and logic to all possible VOQs at one time.

The request manager controller 1406 in FIG. 14 may represent a structure in FIG. 11A, such as a controller in the request managers 1116, or constitute a separate structure in the port processor 1100. The request manager controller 1406 is configured to control the request store unit 1404, the CAM 1402 and the RAM 1401.

RAM

The RAM 1401 in FIG. 14 may represent a structure in FIG. 11A, such as the buffer 1106 or the iVOQs 1110, or constitute a separate structure in the port processor 1100. The RAM 1401 is configured to store cells (also called packets) received by the receiver 1102 (FIG. 11A) of the port processor 1100 from a line card. The RAM 1401 may be referred to as a cell storage or cell buffer. Each location in the RAM 1401 may store a cell of any VOQ in any order. The RAM 1401 may comprise any number of locations configured to store cells. In one embodiment, for example, the RAM 1401 has 1,024 locations configured to store 1,024 cells.

CAM

The CAM 1402 in FIG. 14 may be implemented with any type of memory structure known to those of ordinary skill in the electrical arts. The CAM 1402 may be implemented in one of the structures in FIG. 11A, such as the buffer 1106, the queue manager 1112 or the request managers 1116, or constitute a separate structure in the port processor 1100. The CAM 1402 may be referred to as a cell address lookup structure. The CAM 1402 is configured to store a plurality of cell location lookup entries, as shown in FIG. 15. The controller 1406 may use the CAM 1402 to find the location of a cell in the RAM 1401.

FIG. 15 illustrates an exemplifying format of each cell address lookup entry in the CAM 1402 of FIG. 14. As shown in FIG. 15, each cell address lookup entry comprises a plurality of fields, such as a valid bit [0], a pointer [10:1], a priority level [13:11] and a destination address [24:14]. Other embodiments of the CAM 1402 may have valid, pointer, priority and destination address fields smaller or larger than the fields shown in FIG. 15. Other embodiments of the CAM 1402 may have other fields in addition to or instead of the fields in FIG. 15.

Each cell stored in the RAM 1410 is uniquely identified by a destination address, a priority level and a memory address of an entry in the CAM 1402. The destination address and priority level fields in FIG. 15 of a CAM entry combine to identify an active VOQ managed by the request store unit 1404. The pointer field in FIG. 15 indicates an entry within the VOQ identified by the destination address and priority level fields and managed by the request store unit 1404. The valid bit in FIG. 15 indicates whether the entry in the VOQ identified by the destination address, priority level and pointer fields is available to store an incoming request. For example, if the valid bit is "0," the entry is available to store an incoming request. If the valid bit is "1," the entry is not available to store an incoming request. In another embodiment, a valid bit of "1" indicates an entry is available to store an incoming request.

In one embodiment, the size of the CAM 1402 in FIG. 14 may be limited by the size of the RAM 1401 because the CAM 1402 does not need to have more entries than the number of cell storage locations in the RAM 1401. In one embodiment, the CAM 1402 has 1,024 entries, which correspond to the 1,024 cell storage locations in the RAM 1401.

Request Store Unit

The request store unit 1404 in FIG. 14 may be implemented with logic, such as an array of flip-flops configured as registers, or a memory. The request store unit 1404 may be implemented in one of the structures in FIG. 11A, such as the queue manager 1112 or the request managers 1116, or constitute a separate structure in the port processor 1100. The request store unit 1404 is configured to store information (see FIGS. 16A–17) about every VOQ that is currently active, i.e., every VOQ currently storing cell schedule requests.

The request store unit 1404 may be configured to track "unicast" requests or "multicast" requests. "Unicast" refers to a cell that should be sent to a single destination port. "Multicast" refers to a cell that should be sent to multiple destination ports. The port processor 1100 in FIG. 11A may have (a) a unicast request store unit, (b) a multicast request store unit, (c) a request store unit that tracks both unicast and multicast requests or (d) separate request store units, one for tracking unicast requests and the other for tracking multicast requests.

FIG. 16A illustrates an exemplifying format of each entry in a "unicast" request store unit, such as the request store unit 1404 in FIG. 14. As shown in FIG. 16A, each entry in a unicast request store unit comprises a plurality of fields, such as a valid bit [0], a priority level [7:1], a destination address [19:8], a request count [23:20], a head pointer [33:24], a tail pointer [43:34], a queue-over-limit bit [44] and a flow control bit [45]. Other embodiments of the request store unit 1404 may have fields smaller or larger than the fields shown in FIG. 16A. Other embodiments of the request store unit 1404 may have other fields in addition to or instead of the fields in FIG. 16A.

The destination address and priority level fields in FIG. 16A uniquely identify an active VOQ when the valid bit in FIG. 16A is asserted. The head and tail pointer fields in FIG. 16A indicate a first entry and a last entry, respectively, of an active VOQ identified by the destination address and priority level fields. The request manager controller 1406 in FIG. 14 may use the head and tail pointer fields in FIG. 16A to access and update entries in the cell lookup CAM 1402. The head and tail pointers in FIG. 16A allow a VOQ identified by the destination address and priority level fields to operate as a circular buffer. During a write operation, the controller 1406 increments the tail pointer. During a read operation, the controller 1406 increments the head pointer. Thus, the difference between the head and tail pointers of each entry in the request store unit 1404 provides the size of an active VOQ. When the head and tail pointers are equal, the VOQ identified by the destination address and priority level fields in FIG. 16A is empty.

The request count field (also called request counter) in FIG. 16A counts a number of requests in the VOQ identified by the destination address and priority level fields that have been sent to the scheduler 106 (FIG. 1). In one embodiment, the maximum number of outstanding requests is approximately 40. The maximum number of outstanding requests may be set by accessing a MaxReq value stored in a register in the structure 1400.

The queue-over-limit bit in FIG. 16A may indicate (1) that the VOQ identified by the destination address and priority level fields has more entries than a configurable, pre-determined maximum VOQ size limit or (2) that a number of outstanding/pending requests exceeds the MaxReq value. In the first case, the controller 1406 (FIG. 14) may initiate flow control by preventing any more received cells destined for a particular destination address from being stored in the RAM 1401 and/or sending a message to the line card to stop sending such cells to the port processor 1100 (FIG. 11A). In the second case, the controller 1406 may stop sending requests from the VOQ identified by the destination address in FIG. 16A to the scheduler 106.

The valid bit in FIG. 16A indicates whether a particular location/entry in the unicast request store unit 1404 is in use or active.

The flow control bit in FIG. 16A indicates whether the port processor 1100 (FIG. 11A) has initiated a flow control process for the particular destination address and priority level in FIG. 16A. The controller 1406 may initiate flow control if, for example, the RAM buffer 1401 is full or nearly full with cells. As another example, the controller 1406 may initiate flow control if the controller 1406 receives a cell with a destination address and priority level different than all of the active entries in the request store unit 1404 and there are no more available entries in the request store unit 1404.

An asserted flow control bit in FIG. 16A may (1) prevent the controller 1406 from receiving any more cells destined for a particular destination address, (2) prevent the controller 1406 from storing any more received cells destined for a particular destination address, or (3) prevent the controller 1406 (FIG. 14) from sending cells or requests for a particular destination port processor or reduce the rate of cell transmission.

FIG. 16B illustrates another exemplifying format of each entry in a unicast request store unit, such as the request store unit 1404 in FIG. 14. As shown in FIG. 16B, each entry in a unicast request store unit comprises a plurality of fields, such as a valid bit [0], a priority level [3:1], a destination address [15:4], a request count [19:16], a head pointer [29:20], a tail pointer [39:30] and a flow control bit [40]. Other embodiments of the request store unit 1404 may have fields smaller or larger than the fields shown in FIG. 16B. Other embodiments of the request store unit 1404 may have other fields in addition to or instead of the fields in FIG. 16B.

The number of possible entries in the request store unit 1404 in FIG. 14 may be limited by the size of the RAM 1401. In one embodiment, the RAM buffer 1401 is configured to store a maximum of 1024 cells, the maximum number of possible VOQs active at one time is equal to 1024, and each active VOQ contains one cell header request. In this embodiment, the request store unit 1404 may have 1024 entries.

But the probability of 1024 VOQs being active at the same time and all VOQs having just one entry in the RAM buffer 1401 may be very low. In one embodiment, the RAM buffer 1401 has 1024 entries, and the request store unit 1404 may be reduced in size to 256 entries. In the very unlikely event that all 256 entries of the request store unit 1404 are tracking 256 VOQs, the port processor 1100 can "flow control" incoming cells by de-activating a link to a line card coupled to the port processor 1100.

The structure 1400 in FIG. 14 may advantageously perform a number of operations in an efficient manner, such as sending requests to the scheduler 106 (FIG. 1), tracking requests sent to the scheduler 106, processing request grants from the scheduler 106 and refreshing the RAM 1401, CAM 1402 and/or the request store unit 1404.

Incoming Unicast Cells

FIG. 18 illustrates a method of processing an incoming unicast cell with the structure 1400 in FIG. 14. In a block 1800, the port processor 1100 (FIG. 11A) receives a unicast cell from the line card coupled to the port processor 1100. The controller 1406 or some other component of the port processor 1100 extracts the destination address and priority bits from the header of the cell. As described above, FIG. 3A illustrates an example of a cell header. A cell header may have any configurable number of destination address and priority bits.

In a block 1802, the request manager controller 1406 locates an entry, such as entry 1414, in the unicast request store unit 1404 that has the same destination address and priority level as the received cell. The entry 1414 corresponds to an active VOQ identified by the destination address and the priority level of the entry 1414. If there is no entry, i.e., no active VOQ, with the same destination address and priority level as the received cell in the request store unit 1404, the controller 1406 creates a new entry in the request store unit 1404 to track a new active VOQ. The controller 1406 may periodically erase inactive entries that correspond to empty VOQs, where the head pointer is equal to the tail pointer (FIG. 16A or 16B).

In a block 1804, the controller 1406 locates an available/empty/free entry 1412 in the CAM 1402, i.e., a CAM entry with a de-asserted valid bit (FIG. 15). The controller 1406 may locate a next available entry in the CAM 1402 specified by a pointer from a list of available entries. This list may be stored in or near the controller 1406 or CAM 1402. In another embodiment, the controller 1406 randomly selects an available entry. The controller 1406 transfers the destination address and priority level from the request store entry 1414 to the destination address and priority level fields (FIG. 15) of the available entry 1412 in the CAM 1402 and asserts the valid bit of the CAM entry 1412. The controller 1406 also writes the tail pointer of the entry 1414 in the request store unit 1404 into the pointer field (FIG. 15) of the CAM entry 1412. Thus, the newly written entry 1412 in the CAM 1402 corresponds to a cell in a VOQ identified by the destination address and priority level and tracked by the request store unit 1404.

In a block 1806, the controller 1406 loads or writes the received cell into a memory location 1410 in the RAM buffer 1401 that corresponds to the address of the new CAM entry 1412.

In a block 1808, the controller 1406 increments the tail pointer (FIG. 16A or FIG. 16B), and a length counter if there is a length counter, of the entry 1414 in the request store unit 1404.

When the port processor 1100 in FIG. 11A sends a cell schedule request to the scheduler 106 (FIG. 1) to schedule a cell transmission, the controller 1406 accesses the request store unit 1404 and finds the entry with a destination address and priority level (FIG. 16A or 16B) that match the destination address and priority level of the request. The controller 1406 then increments the request count field (FIG. 16A or 16B) in that entry of the request store unit 1404.

Processing a Request Grant

Figure 19:
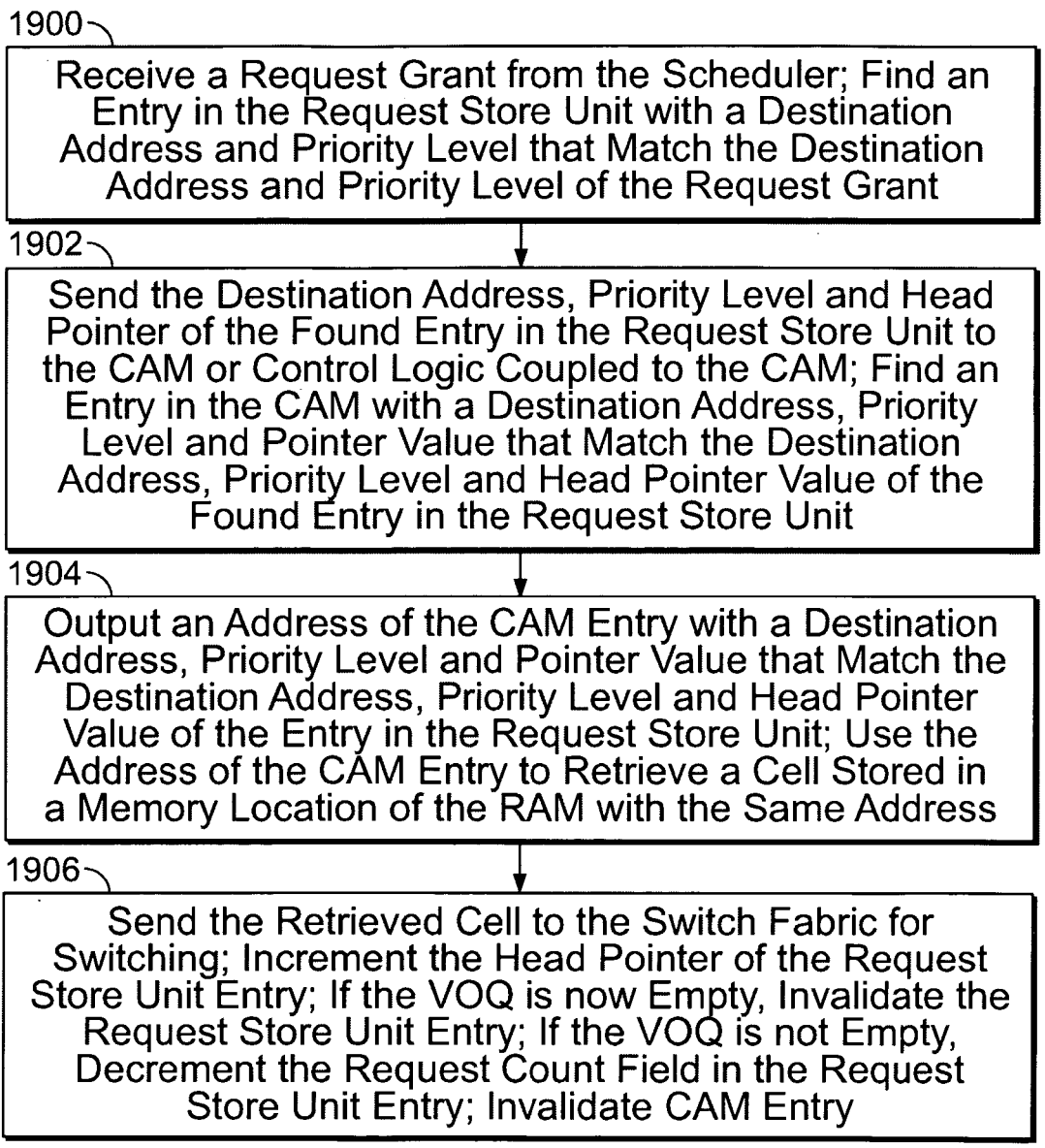
FIG. 19 illustrates a method of processing a request grant from the scheduler in FIG. 1 with the structure in FIG. 14.

FIG. 19 illustrates a method of processing a request grant from the scheduler 106 in FIG. 1 with the structure 1400 in FIG. 14. In a block 1900, the scheduler 106 (FIG. 1) sends a request grant to the port processor 1100 (FIG. 11A). The controller 1406 searches for an entry in the request store unit 1404 with a destination address and priority level (FIG. 16A or 16B) that match the destination address and priority level of the request grant.

In a block 1902, after the controller 1406 finds the appropriate entry, e.g., entry 1414, in the request store unit 1404, the controller 1406 sends the destination address, priority level and head pointer (FIG. 16A or 16B) of the entry 1414 from the request store unit 1404 to the CAM 1402 or control logic coupled to the CAM 1402. The CAM 1402 (or control logic) finds an entry, e.g., entry 1412, in the CAM 1402 with a destination address, priority level and pointer value (FIG. 15) that match the destination address, priority level and head pointer value (FIG. 16A or 16B) of the identified entry 1414 in the request store unit 1404.

In a block 1904, the CAM 1402 (or control logic) outputs an address of the entry 1412 in the CAM with a destination address, priority level and pointer value (FIG. 15) that match the destination address, priority level and head pointer value (FIG. 16A or 16B) of the entry 1414 in the request store unit 1404. The controller 1406 uses the address of the entry 1412 to retrieve a cell stored in a memory location 1410 of the RAM 1401 with the same address.

In a block 1906, the controller 1406 sends the retrieved cell to the switch fabric 104 (FIG. 1) for switching. The controller 1406 increments the head pointer (FIG. 16A or 16B) of the entry 1414. If the VOQ is now empty, i.e., the head pointer of the entry 1414 is equal to the tail pointer, the controller 1406 may invalidate the entry 1414 by de-asserting the valid bit (FIG. 16A or 16B) of the entry 1414. Thus, the invalidated entry 1414 is available to store information for a VOQ activated in the future. If the VOQ is not empty, i.e., the head pointer of the entry 1414 is not equal to the tail pointer, the controller 1406 decrements the request count field (FIG. 16A or 16B) in the entry 1414 of the request store unit 1404.

The controller 1406 also invalidates the entry 1412 in the CAM 1402 by de-asserting the valid bit (FIG. 15) in the entry 1414, which effectively makes the entry 1414 available for a future write operation. The controller 1406 may add the entry to a list of free or available CAM entries.

In one embodiment, both ACK grants and NACK signals (a "NACK" is a schedule request rejected by the scheduler 106 and sent back to the port processor 1100) cause the controller 1406 to decrement the request count field (FIG. 16A or 16B) of an entry in the request store unit 1404. A refresh command or event sets the request count field in FIG. 16A or 16B of one or more entries in the request store unit 1404 to zero.

Thus, the controller 1406 uses pointers in the request store unit 1404 to locate entries in the CAM 1402. The CAM 1402 uses the destination address, priority level and pointer value from an entry in the request store unit 1404 to send an address of a requested cell stored in the RAM 1401 to the controller 1406. The CAM 1402 and the request store unit 1404 may greatly reduce the complexity of circuitry used to implement VOQs.

In the embodiments described herein with reference to FIGS. 14–19, the structure 14 may be configured to manage unicast or multicast cells with destination addresses but without priority levels. For example, the entries shown in FIGS. 16A, 16B and 17 may not include a priority level field. Thus, the controller 1406 in FIG. 14 may simply use the destination addresses of cells to create and manage VOQs.

Arbitration Between VOs

Without the structure 1400, the port processor 1100 (FIG. 11A) examines all possible VOQs and priorities, even if one or more VOQs are empty, and arbitrates between the VOQs to pass a request to the scheduler 106 (FIG. 1), as described above. Arbitration between VOQs with various destination addresses and priority levels becomes much simpler with the structure 1400 in FIG. 14. With the structure 1400, the controller 1406 simply examines the active entries in the request store unit 1404. Because there are only 256 possible entries in one embodiment of the request store unit 1404, the overall priority and fairness allocation is much simpler, and the corresponding combinatorial logic structure may be reduced in size.

Multicast Cell

FIG. 17 illustrates an exemplifying format of each entry in a multicast request store unit, such as the request store unit 1404 in FIG. 14. As shown in FIG. 17, each entry in a multicast request store unit comprises a plurality of fields, such as a valid bit [0], a priority level [3:1], a cell requested field [7:4], a cell sent field [11:8], a flow control field [15:12], a cell address field [25:16], a first destination address [37:26], a second destination address [49:38], a third destination address [61:50] and a fourth destination address [73:62]. Other embodiments of the request store unit 1404 may have fields smaller or larger than the fields shown in FIG. 17. Other embodiments of the request store unit 1404 may have other fields in addition to or instead of the fields in FIG. 17, such more than four destination addresses. In another embodiment, the entry in FIG. 17 may have less than four destination addresses.

The methods described above for managing unicast cells may generally be applied to managing multicast cells. For example, the valid bit, priority field and flow control fields in FIG. 17 are similar in function to the valid bit, priority field and flow control fields described above with reference to FIG. 16A. Each bit of the 4-bit flow control field in FIG. 17 corresponds to one of the four destination addresses. The controller 1406 asserts a bit of the 4-bit flow control field in FIG. 17 to flow control one of the four destination addresses in FIG. 17.

There are some differences between managing unicast cells and managing multicast cells. In one embodiment, each entry (FIG. 17) in a multicast request store unit, such as the request store unit 1404 in FIG. 14, comprises information about a single multicast cell stored in the RAM buffer 1401, instead of information about a complete VOQ. For example, the destination addresses in FIG. 17 specify a plurality of destination port processors to which the multicast cell should be sent. All destination addresses in FIG. 17 for each entry are stored in the multicast request store unit to allow flow control and to prevent head-of-line (HOL) blocking.

The 4-bit cell requested field in FIG. 17 specifies whether a request has been sent to the scheduler 106 (FIG. 1) for one or more destination addresses in the entry. Each bit of the 4-bit cell requested field in FIG. 17 corresponds to one of the four destination addresses.

The 4-bit cell sent field in FIG. 17 specifies whether the cell stored in the RAM 1401 has been sent to the switch fabric 104 (FIG. 1) after a schedule grant for one or more destination addresses in the entry. Each bit of the 4-bit cell sent field in FIG. 17 corresponds to one of the four destination addresses.

The 10-bit cell address field in FIG. 17 specifies the address of the cell stored in the 1024-entry RAM 1401. If the RAM 1401 has more entries than 1024, then the cell address field has more bits. If the RAM 1401 has less than 1024 entries, then the cell address field may have fewer bits.

In one embodiment, the entries are loaded and unloaded in the multicast request store unit in a FIFO manner to preserve cell ordering.

In one embodiment, queues for multicast cells are implemented by counters external to the multicast request store unit. Depending on system requirements, these counters may either implement multicast queuing per priority (i.e., queuing multicast cells based on their priority levels, such that all multicast cells of a first priority are in a first queue and all multicast cells of a second priority are in a second queue) or multicast queuing per channel (i.e., queuing multicast cells based on their destination addresses). A multicast cell may have a channel ID, which corresponds to a one or more destination port addresses in a look-up table.

In one embodiment, the number of entries in a multicast request store unit may be reduced from the number of entries in the unicast request store unit, e.g., 256, to 128, for example, for two reasons. First, each entry (FIG. 17) in a multicast request store unit represents a plurality of destination addresses, such as four addresses. Second, multicast traffic typically constitutes a small proportion of overall system traffic, and less logic may be dedicated to handle multicast cells.

In one embodiment, the controller 1406 uses the lookup CAM 1401 differently in managing multicast cells compared to managing unicast cells. The controller 1406 uses the cell address (FIG. 17) in an entry of the multicast request store unit to retrieve the cell from the RAM 1401 and send the cell to multiple destinations. In this embodiment, the only CAM function used by the controller 1406 is locating free entries in the CAM 1402 first and then in the RAM 1401. When the controller 1406 uses a free entry in the CAM 1402, the controller 1406 sets a VALID bit in the CAM entry. Once a multicast cell has been sent to all specified destinations, the controller 1406 restores an entry in the CAM 1402 to a list of free or available entries.

The above-described embodiments of the present invention are merely meant to be illustrative and not limiting. Various changes and modifications may be made without departing from the invention in its broader aspects. For example, the control unit 710 (FIG. 7A) may comprise a locking circuit with other components in addition or instead of a JK flip-flop 732 (FIG. 7C) and an AND gate 746.

As another example, one embodiment of the switch architecture (100 in FIG. 1 or 1000 in FIG. 10) may have 32 port processors (102 in FIG. 2 or 1100 in FIG. 11A) and at least one scheduler 106 (FIG. 1 or FIG. 10) with 32 scheduler port controllers 402, eight 4×4 randomizers 500 (FIG. 5), four 8×8 routing modules 502 in the first routing stage 408 and eight 4×4 routing modules 502 in the second routing stage 410. The switch architecture (100 in FIG. 1 or 1000 in FIG. 10) may have any number of randomizers 500 and routing modules 502, where each randomizer 500 and each routing module 502 may any number of inputs and outputs. The appended claims encompass such changes and modifications within the spirit and scope of the invention.

What is claimed is:

1. A port processor configured to receive data packets from a line card, each data packet comprising a destination port address and data, the port processor comprising:
   a random access memory (RAM) configured to store packets from the line card;
   a content addressable memory (CAM) configured to store a plurality of entries, each CAM entry configured to comprise (a) a destination port address field and (b) a pointer field, wherein each CAM entry has a memory address corresponding to a memory location of the RAM;
   a storage unit configured to store a plurality of queue entries, each queue entry configured to comprise (a) a destination port address of a set of one or more CAM entries, (b) a header pointer field equal to a pointer field of a first CAM entry in the set, and (c) a tail pointer field equal to a pointer field of a last CAM entry in the set; and
   a controller configured to control the RAM, CAM and storage unit.

2. The port processor of claim 1, wherein the controller is configured to transfer packets from the line card to the RAM and transfer packets from the RAM to a switch fabric.

3. The port processor of claim 1, wherein the controller is configured to (a) receive a packet from the line card, (b) create a queue entry in the storage unit, the queue entry comprising a destination port address equal to a destination port address of the packet, (c) write an entry in the CAM, the CAM entry comprising the destination port address of the packet and a tail pointer field of the queue entry, and (d) store the packet in a location in the RAM corresponding to a memory address of the CAM entry.

4. The port processor of claim 3, wherein the controller is configured to create a new queue entry in the storage unit when the controller receives a packet with a destination port address that does not match a destination port address of any queue entry in the storage unit.

5. The port processor of claim 3, wherein the controller is further configured to increment the tail pointer field of the queue entry.

6. The port processor of claim 1, wherein the controller is configured to (a) receive a packet from the line card, (b) find a queue entry in the storage unit, the queue entry comprising a destination port address equal to a destination port address of the packet, (c) write an entry in the CAM, the CAM entry comprising the destination port address of the packet and a tail pointer field of the queue entry, and (d) store the packet in a location in the RAM corresponding to a memory address of the CAM entry.

7. The port processor of claim 6, wherein the controller is further configured to increment the tail pointer field of the queue entry.

8. The port processor of claim 1, wherein the controller is configured to send a schedule request to a scheduler, the schedule request based on a destination port address of a queue entry in the storage unit.

9. The port processor of claim 8, wherein the controller is further configured to increment a count field in the queue entry, the count field being equal to a number of schedule requests sent to the scheduler based on the destination port address of the queue entry.

10. The port processor of claim 1, wherein the controller is configured to (a) find a queue entry in the storage unit with a destination port address that matches a destination port address of a request grant from a scheduler, (b) send the destination port address and a head pointer field of the queue entry to the CAM, (c) receive a memory address of an entry in the CAM, the CAM entry having a destination port address and pointer field that match the destination port address and head pointer field of the queue entry, and (d) transfer a packet from a location in the RAM to a switch fabric, the location corresponding to the memory address of the CAM entry.

11. The port processor of claim 10, wherein the controller is further configured to increment the head pointer field of the queue entry.

12. The port processor of claim 11, wherein the controller is further configured to delete the queue entry if the head pointer field is equal to the tail pointer field.

13. The port processor of claim 10, wherein the controller is further configured to decrement a request count field in the queue entry, the count field being equal to a number of pending schedule requests sent to the scheduler based on the destination port address of the queue entry.

14. The port processor of claim 1, wherein the controller is configured to erase an entry in the CAM when the controller transfers a packet corresponding to the CAM entry from the RAM to a switch fabric.

15. A port processor configured to receive data packets from a line card, each data packet comprising a destination port address, a priority level and data, the port processor comprising:
- a random access memory (RAM) configured to store packets from the line card;
- a content addressable memory (CAM) configured to store a plurality of entries, each CAM entry configured to comprise (a) a destination port address field, (b) a priority level, and (c) a pointer field, wherein each CAM entry has a memory address corresponding to a memory location of the RAM;
- a storage unit configured to store a plurality of queue entries, each queue entry configured to comprise (a) a destination port address of a set of one or more CAM entries, (b) a priority level of the set of one or more CAM entries, (c) a header pointer field equal to a pointer field of a first CAM entry in the set, and (d) a tail pointer field equal to a pointer field of a last CAM entry in the set; and
- a controller configured to control the RAM, CAM and storage unit.

16. The port processor of claim 15, wherein the controller is configured to (a) receive a packet from the line card, (b) find a queue entry in the storage unit, the queue entry comprising a destination port address and a priority level equal to a destination port address and a priority level of the packet, (c) write an entry in the CAM, the CAM entry comprising the destination port address and priority level of the packet and a tail pointer field of the queue entry, and (d) store the packet in a location in the RAM corresponding to a memory address of the CAM entry.

17. The port processor of claim 15, wherein the controller is configured to send a schedule request to a scheduler, the schedule request based on a destination port address and a priority level of a queue entry in the storage unit.

18. The port processor of claim 15, wherein the controller is configured to (a) find a queue entry in the storage unit with a destination port address and a priority level that match a destination port address and a priority level of a request grant from a scheduler, (b) send the destination port address, priority level and a head pointer field of the queue entry to the CAM, (c) receive a memory address of an entry in the CAM, the CAM entry having a destination port address, priority level and pointer field that match the destination port address, priority level and head pointer field of the queue entry, and (d) transfer a packet from a location in the RAM to a switch fabric, the location corresponding to the memory address of the CAM entry.

19. A controller in a packet switching system, the controller being configured to (a) receive a packet from a line card, (b) find a queue entry in a storage unit, the queue entry comprising a destination port address equal to a destination port address of the packet, (c) write an entry in a content addressable memory (CAM), the CAM entry comprising the destination port address of the packet and a pointer value from the queue entry, and (d) store the packet in a location in a random access memory (RAM) corresponding to a memory address of the CAM entry.

20. The controller of claim 19, further configured to send a schedule request to a scheduler, the schedule request based on a destination port address of a queue entry in the storage unit.

21. The controller of claim 20, further configured to increment a count field in the queue entry, the count field being equal to a number of schedule requests sent to the scheduler based on the destination port address of the queue entry.

22. A controller in a packet switching system, the controller being configured to (a) find a queue entry in a storage unit with a destination port address that matches a destination port address of a request grant from a scheduler, (b) send the destination port address and a head pointer field of the queue entry to a content addressable memory (CAM), (c) receive a memory address of an entry in the CAM, the CAM entry having a destination port address and pointer field that match the destination port address and head pointer field of the queue entry, and (d) transfer a packet from a location in a random access memory (RAM) to a switch fabric, the location corresponding to the memory address of the CAM entry.

23. The controller of claim 22, wherein the controller is further configured to decrement a request count field in the queue entry, the count field being equal to a number of pending schedule requests sent to the scheduler based on the destination port address of the queue entry.

24. A content addressable memory (CAM) in a packet switching system, the CAM being configured to store a plurality of entries, each CAM entry configured to comprise (a) a destination port address and (b) a pointer field, each CAM entry having a memory address corresponding to a memory location of a random access memory (RAM), the CAM being configured to receive a destination port address and a pointer value and output a memory address of a CAM entry comprising the same destination port address and pointer value.

25. The CAM of claim 24, wherein each CAM entry further comprises a priority level, the CAM being configured to receive a destination port address, a priority level and a pointer value and output a memory address of a CAM entry comprising the destination port address, priority level and pointer value.

26. The CAM of claim 24, wherein each CAM entry further comprises a valid bit to indicate whether the entry currently corresponds to a packet stored in the RAM.

27. A storage unit in a packet switching system, the storage unit being configured to store a plurality of queue entries, each queue entry configured to comprise (a) a destination port address common to a set of one or more entries in a content addressable memory (CAM), (b) a header pointer field equal to a pointer field of a first entry in the set of CAM entries, and (c) a tail pointer field equal to a pointer field of a last entry in the set of CAM entries, the storage unit being configured to output the destination port address, header pointer and the tail pointer.

28. The storage unit of claim 27, wherein each queue entry is erasable to store a destination port address common to a new set of one or more entries in the CAM.

29. The storage unit of claim 27, wherein the head pointer field and the tail pointer field of each entry may be independently incremented.

30. The storage unit of claim 27, wherein each queue entry further comprises a priority level common to a set of one or more entries in a CAM.

31. The storage unit of claim 27, wherein each queue entry further comprises a request count field, the request count field being equal to a number of schedule requests sent to a scheduler based on the destination port address of the queue entry.

32. The storage unit of claim 27, wherein each queue entry further comprises a queue-over-limit field configured to indicate that a number of CAM entries in a set exceeds a pre-determined number.

33. The storage unit of claim 27, wherein each queue entry further comprises a queue-over-limit field configured to indicate that a number of pending schedule requests sent to a scheduler based on the destination port address of the queue entry exceeds a pre-determined number.

34. The storage unit of claim 27, wherein each queue entry further comprises a flow control bit configured to indicate whether a controller has initiated a flow control process for the destination port address of the queue entry.

35. A controller in a packet switching system, the controller being configured to (a) receive a multicast packet from a line card, the packet comprising data and a plurality of destination port addresses, (b) store an entry in a storage unit, the entry comprising the destination port addresses of the packet and an address of a location in a random access memory (RAM) configured to store the packet, and (c) store the packet in the location of the RAM.

36. The controller of claim 35, wherein the entry in the storage unit further comprises a flow control field configured to indicate whether any destination port address of the multicast packet has been flow-controlled.

37. The controller of claim 35, wherein the entry in the storage unit further comprises a packet requested field configured to indicate whether a request has been sent to a scheduler for any of the destination port addresses in the entry.

38. The controller of claim 35, wherein the entry in the storage unit further comprises a packet sent field configured to indicate whether the packet has been sent to any of the destination port addresses in the entry.

39. The controller of claim 35, wherein the entry in the storage unit further comprises a priority level field configured to indicate the priority level of the packet.

40. The controller of claim 35, further configured to send a plurality of schedule requests to a scheduler based on the plurality of destination port addresses of a multicast packet.

41. A storage unit in a packet switching system, the storage unit being configured to store a plurality of entries, each entry configured to comprise (a) a plurality of destination port addresses of a multicast packet and (b) an address of a location in a random access memory (RAM) configured to store the packet.

42. A method of managing a packet in a packet switching system, the method comprising:
creating a queue entry based on a destination port address of a packet received from a line card, the queue entry comprising the destination port address of the packet and a tail pointer value;
transferring the destination address and tail pointer value to an available entry in a content addressable memory (CAM); and
writing the packet to a location in a random access memory (RAM) that corresponds to an address of the entry in the CAM.

43. The method of claim 42, further comprising incrementing the tail pointer value of the queue entry.

44. A method of using a port processor in a packet switching system, the method comprising:
creating a queue entry based on a destination port address and a priority level of a packet received from a line card, the queue entry comprising the destination port address and priority level of the packet and a tail pointer value;
transferring the destination address, priority level and tail pointer value to an available entry in a content addressable memory (CAM); and
writing the packet to a location in a random access memory (RAM) that corresponds to an address of the entry in the CAM.

45. A method of processing a schedule request grant from a scheduler, the method comprises:
receiving a schedule request grant from a scheduler;
finding a queue entry in a storage unit with a destination port address that matches a destination port address of the schedule request grant;
sending the destination port address and a head pointer field of the queue entry to a content addressable memory (CAM);
receiving a memory address of an entry in the CAM, the CAM entry having a destination port address and pointer field that match the destination port address and head pointer field of the queue entry; and transferring a packet from a location in a random access memory (RAM) to a switch fabric, the location corresponding to the memory address of the CAM entry.

46. A method of processing a multicast packet, the method comprising:

receiving a multicast packet from a line card, the packet comprising data and a plurality of destination port addresses;

storing an entry in a storage unit, the entry comprising the destination port addresses of the packet and an address of a location in a random access memory (RAM) configured to store the packet; and storing the packet in the location of the RAM.

* * * * *